(12) United States Patent
Cho et al.

(10) Patent No.: US 9,975,969 B2
(45) Date of Patent: May 22, 2018

(54) METHOD OF PREPARING POLYOLEFIN, AND POLYOLEFIN PREPARED THEREBY

(71) Applicant: LG CHEM, LTD., Seoul (KR)

(72) Inventors: Kyung Jin Cho, Daejeon (KR); Yong Ho Lee, Daejeon (KR); Ki Soo Lee, Daejeon (KR); Min Seok Cho, Daejeon (KR); Se Young Kim, Daejeon (KR); Sung Min Lee, Daejeon (KR); Jin Young Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 23 days.

(21) Appl. No.: 15/021,238

(22) PCT Filed: Nov. 21, 2014

(86) PCT No.: PCT/KR2014/011275
§ 371 (c)(1),
(2) Date: Mar. 10, 2016

(87) PCT Pub. No.: WO2015/076618
PCT Pub. Date: May 28, 2015

(65) Prior Publication Data
US 2016/0222139 A1   Aug. 4, 2016

(30) Foreign Application Priority Data

Nov. 21, 2013 (KR) .................. 10-2013-0142301
Dec. 6, 2013 (KR) .................. 10-2013-0151402
Nov. 21, 2014 (KR) .................. 10-2014-0163282

(51) Int. Cl.
| C08F 2/01 | (2006.01) |
|---|---|
| C08F 4/6592 | (2006.01) |
| C08F 10/00 | (2006.01) |
| C08F 10/02 | (2006.01) |
| C08F 4/659 | (2006.01) |
| C08F 2/00 | (2006.01) |

(52) U.S. Cl.
CPC .............. C08F 10/02 (2013.01); C08F 2/001 (2013.01); C08F 4/65904 (2013.01); C08F 10/00 (2013.01); C08F 4/65912 (2013.01); C08F 4/65916 (2013.01); C08F 2410/03 (2013.01); C08F 2420/06 (2013.01)

(58) Field of Classification Search
CPC .. C08F 4/65904; C08F 4/65916; C08F 10/00; C08F 2/001
See application file for complete search history.

(56) References Cited

U.S. PATENT DOCUMENTS

| 6,147,025 A | 11/2000 | Gillis et al. |
|---|---|---|
| 8,329,834 B2 | 12/2012 | Masino et al. |
| 8,450,436 B2 | 5/2013 | Masino et al. |
| 2010/0331501 A1 | 12/2010 | Murray et al. |

FOREIGN PATENT DOCUMENTS

| CN | 101935367 A | 1/2011 |
|---|---|---|
| CN | 102993341 A | 3/2013 |
| EP | 1939250 A1 | 7/2008 |
| JP | 2002-30109 A | 1/2002 |
| JP | 2009527636 A | 7/2009 |
| JP | 2011-132409 A | 7/2011 |
| KR | 10-0533888 B1 | 12/2005 |
| KR | 10-0579843 B1 | 5/2006 |
| KR | 10-0961079 B1 | 6/2010 |
| KR | 10-2012-0035165 A | 4/2012 |
| KR | 10-2012-0052904 A | 5/2012 |
| KR | 10-2012-0076156 A | 7/2012 |
| KR | 10-2012-0110187 A | 10/2012 |
| KR | 10-2012-0111530 A | 10/2012 |
| KR | 10-2013-0019793 A | 2/2013 |
| KR | 10-2013-0057217 A | 5/2013 |
| KR | 10-2014-0041162 A | 4/2014 |
| WO | 2012/097146 A1 | 7/2012 |

*Primary Examiner* — Caixia Lu
(74) *Attorney, Agent, or Firm* — Dentons US LLP

(57) ABSTRACT

A method of preparing a polyolefin, wherein the method is used to more effectively prepare a polyolefin which has a high molecular weight and multimodal molecular weight distribution, thereby being preferably used for blow-molding or the like, and a polyolefin prepared thereby, are provided.

17 Claims, 1 Drawing Sheet

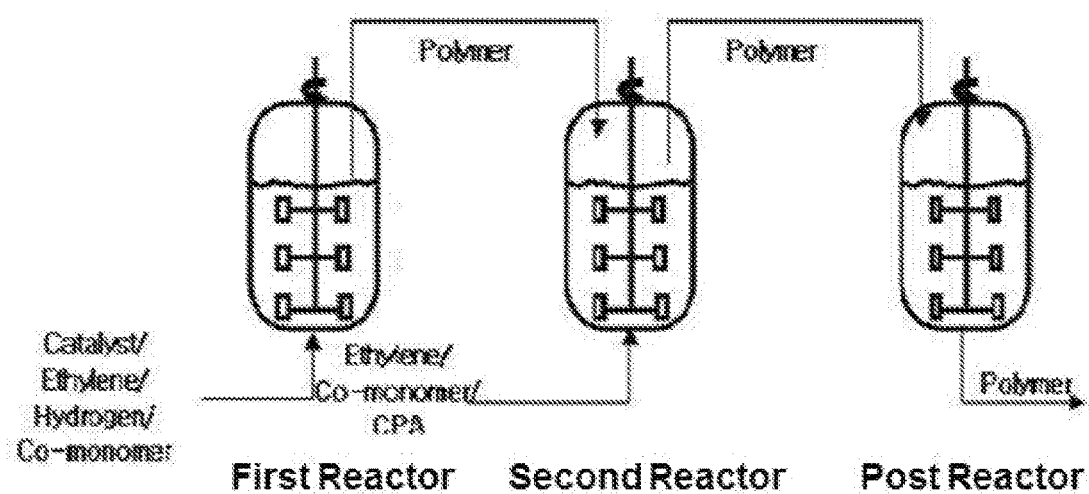

METHOD OF PREPARING POLYOLEFIN, AND POLYOLEFIN PREPARED THEREBY

This application is a National Stage Application of International Application No. PCT/KR2014/011275, filed on Nov. 21, 2014, which claims the benefit of Korean Patent Application No. 10-2013-0142301, filed on Nov. 21, 2013, Korean Patent Application No. 10-2013-0151402, filed on Dec. 6, 2013 and Korean Patent Application No. 10-2014-0163282 filed on Nov. 21, 2014, all of which are hereby incorporated by reference in their entirety for all purposes as if fully set forth herein.

TECHNICAL FIELD

The present invention relates to a method of preparing a polyolefin, wherein the method is used to more effectively prepare a polyolefin which has a high molecular weight and multimodal molecular weight distribution, thereby being preferably used for blow-molding or the like, and to a polyolefin prepared thereby.

BACKGROUND OF THE INVENTION

In general, blow-molded articles are required to have excellent processability, mechanical properties, and environmental stress-cracking resistance. Therefore, there has been a demand for a technology for preparing a polyolefin which satisfies a high molecular weight, a broader multimodal molecular weight distribution, and a uniform comonomer distribution to be preferably used for blow-molding or the like.

Meanwhile, since metallocene catalysts including a Group 4 transition metal are used to easily control the molecular weight and molecular weight distribution of polyolefins, and control a comonomer distribution of polymers, compared to the known Ziegler-Natta catalysts, they have been used in the preparation of polyolefins having both improved mechanical properties and processability. However, there is a drawback that polyolefins prepared using the metallocene catalysts show poor processability because of a narrow molecular weight distribution.

In general, polymers having broad molecular weight distribution exhibit great reduction in viscosity with an increasing shear rate, and thus exhibit excellent processability in the processing area. Polyolefins prepared by metallocene catalysts show high viscosity at a high shear rate due to a relatively narrow molecular weight distribution, etc., and thus there are drawbacks that a high load or pressure is applied during extrusion to reduce extrusion productivity, bubble stability is greatly reduced upon a blow-molding process, and the blow-molded articles have non-uniform surfaces to reduce transparency.

Accordingly, a cascade reactor having a plurality of reactors has been used in order to obtain a polyolefin having a wide multimodal molecular weight distribution using the metallocene catalyst, and attempts have been made to obtain a polyolefin satisfying a wider multimodal molecular weight distribution and a higher molecular weight at the same time through each polymerization step in a plurality of reactors.

However, proper polymerization does not occur in a latter reactor depending on a polymerization time in a former reactor due to high reactivity of the metallocene catalyst. As a result, it is difficult to prepare a polyolefin satisfying a high molecular weight and a wider multimodal molecular weight distribution at the same time. Accordingly, there is a continuous demand for a technology capable of more effectively preparing a polyolefin which has a high molecular weight and a wider multimodal molecular weight distribution, thereby satisfying mechanical properties and processability at the same time and being preferably used for blow-molding or the like.

DETAILS OF THE INVENTION

Objects of the Invention

Accordingly, the present invention provides a method of more effectively preparing a polyolefin which has a high molecular weight and a wider multimodal molecular weight distribution, thereby being preferably used for blow-molding or the like.

Further, the present invention provides a polyolefin which is prepared by the above preparation method, thereby satisfying mechanical properties and processability at the same time and being preferably used for blow-molding or the like.

Means for Achieving the Object

The present invention provides a method of preparing a polyolefin, the method including the step of polymerizing olefin monomers in the presence of a metallocene catalyst, and a molecular weight modifier including a mixture of a cyclopentadienyl metal compound of the following Chemical Formula 1 and an organic aluminum compound of the following Chemical Formula 2 or a reaction product thereof:

$$(R^1\text{-}Cp^1)(R^2\text{-}Cp^2)M^1X_2 \quad \text{[Chemical Formula 1]}$$

wherein $Cp^1$ and $Cp^2$ are each independently a ligand including a cyclopentadienyl group, indenyl group, or fluorenyl group; $R^1$ and $R^2$ are substituents of $Cp^1$ and $Cp^2$, and are each independently an alkyl having 2 to 20 carbon atoms, an alkenyl having 2 to 20 carbon atoms, an alkylaryl having 7 to 20 carbon atoms, an arylalkyl having 7 to 20 carbon atoms, an aryl having 6 to 20 carbon atoms, a heteroalkyl having 1 to 20 carbon atoms, a heteroalkenyl having 2 to 20 carbon atoms, a heteroalkylaryl having 6 to 20 carbon atoms, a heteroarylalkyl having 6 to 20 carbon atoms, or a heteroaryl having 5 to 20 carbon atoms; $M^1$ is a Group 4 transition metal element; and X is a halogen, $$R^3R^4R^5Al \quad \text{[Chemical Formula 2]}$$

wherein $R^3$, $R^4$, and $R^5$ are each independently an alkyl having 4 to 20 carbon atoms or a halogen, and at least one of $R^3$, $R^4$, and $R^5$ is an alkyl having 4 to 20 carbon atoms.

Further, the present invention provides a method of preparing a polyolefin, the method including the step of solution-polymerizing olefin monomers in the presence of a metallocene catalyst, and a molecular weight modifier including a mixture of a cyclopentadienyl metal compound of the following Chemical Formula 3 and an organic aluminum compound of the following Chemical Formula 4 or a reaction product thereof:

$$(R^6\text{-}Cp^3)(R^7\text{-}Cp^4)M^2X'_2 \quad \text{[Chemical Formula 3]}$$

wherein $Cp^3$ and $Cp^4$ are each independently a ligand including a cyclopentadienyl group, an indenyl group, or a fluorenyl group; $R^6$ and $R^7$ are substituents of $Cp^3$ and $Cp^4$ and are each independently hydrogen or a methyl; $M^2$ is a Group 4 transition metal element; and X' is a halogen, $$R^8R^9R^{10}Al \quad \text{[Chemical Formula 4]}$$

wherein $R^8$, $R^9$, and $R^{10}$ are each independently an alkyl having 4 to 20 carbon atoms or a halogen, and at least one of $R^8$, $R^9$, and $R^{10}$ is an alkyl having 4 to 20 carbon atoms.

Further, the present invention provides a polyolefin prepared according to the above method.

Hereinafter, a method of preparing a polyolefin and a polyolefin prepared thereby according to embodiments of the present invention will be described.

According to an embodiment of the present invention, a method of preparing a polyolefin is provided, the method including the step of polymerizing olefin monomers in the presence of a metallocene catalyst and a specific molecular weight modifier.

In particular, the method of preparing a polyolefin may include the step of polymerizing olefin monomers in the presence of a metallocene catalyst, and a molecular weight modifier including a mixture of a cyclopentadienyl metal compound of the following Chemical Formula 1 and an organic aluminum compound of the following Chemical Formula 2 or a reaction product thereof:

$(R^1\text{-}Cp^1)(R^2\text{-}Cp^2)M^1X^2$   [Chemical Formula 1]

wherein $Cp^1$ and $Cp^2$ are each independently a ligand including a cyclopentadienyl group, an indenyl group, or a fluorenyl group; $R^1$ and $R^2$ are substituents of $Cp^1$ and $Cp^2$, and are each independently an alkyl having 2 to 20 carbon atoms, an alkenyl having 2 to 20 carbon atoms, an alkylaryl having 7 to 20 carbon atoms, an arylalkyl having 7 to 20 carbon atoms, an aryl having 6 to 20 carbon atoms, a heteroalkyl having 1 to 20 carbon atoms, a heteroalkenyl having 2 to 20 carbon atoms, a heteroalkylaryl having 6 to 20 carbon atoms, a heteroarylalkyl having 6 to 20 carbon atoms, or a heteroaryl having 5 to 20 carbon atoms. In particular, $R^1$ and $R^2$ may each independently be selected from the group consisting of ethyl, butyl, and t-butoxy hexyl. Further, $M^1$ may be a Group 4 transition metal element, and preferably, is selected from the group consisting of titanium, zirconium, and hafnium. Further, X may be a halogen, and is preferably selected from the group consisting of F, Cl, Br, and I.

$R^3R^4R^5Al$   [Chemical Formula 2]

Herein, $R^3$, $R^4$, and $R^5$ are each independently an alkyl having 4 to 20 carbon atoms or a halogen, and at least one of $R^3$, $R^4$, and $R^5$ is an alkyl having 4 to 20 carbon atoms. In particular, $R^3$, $R^4$, and $R^5$ may each independently be an isobutyl group.

Further, the method of preparing a polyolefin may include the step of solution-polymerizing olefin monomers in the presence of a molecular weight modifier including a mixture of a cyclopentadienyl metal compound of the following Chemical Formula 3 and an organic aluminum compound of the following Chemical Formula 4 or a reaction product thereof:

$(R^6\text{-}Cp^3)(R^7\text{-}Cp^4)M^2X'_2$   [Chemical Formula 3]

wherein $Cp^3$ and $Cp^4$ are each independently a ligand including a cyclopentadienyl group, an indenyl group, or a fluorenyl group; $R^6$ and $R^7$ are substituents of $Cp^3$ and $Cp^4$ and are each independently hydrogen or a methyl; $M^2$ is a Group 4 transition metal element; and X' is a halogen. In particular, $M^1$ may be selected from the group consisting of titanium, zirconium, and hafnium, and X may be selected from the group consisting of F, Cl, Br, and I.

$R^8R^9R^{10}Al$   [Chemical Formula 4]

Herein, $R^8$, $R^9$, and $R^{10}$ are each independently an alkyl having 4 to 20 carbon atoms or a halogen, and at least one of $R^8$, $R^9$, and $R^{10}$ is an alkyl having 4 to 20 carbon atoms. In particular, $R^8$, $R^9$, and $R^{10}$ may each independently be an isobutyl group.

The molecular weight modifier produced by reaction of the cyclopentadienyl metal compound of Chemical Formula 1 and the organic aluminum compound of Chemical Formula 2 may be represented by the following Chemical Formula 5, Chemical Formula 6, or Chemical Formula 7.

[Chemical Formula 5]

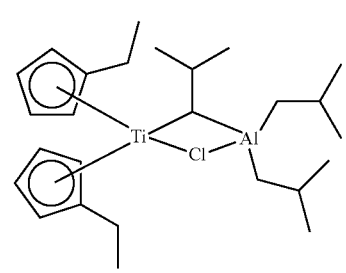

[Chemical Formula 6]

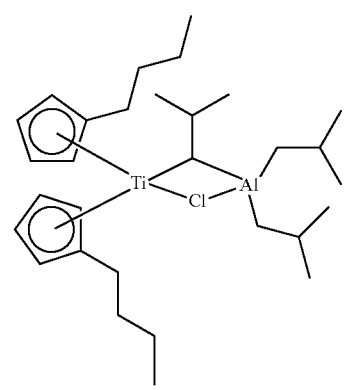

[Chemical Formula 7]

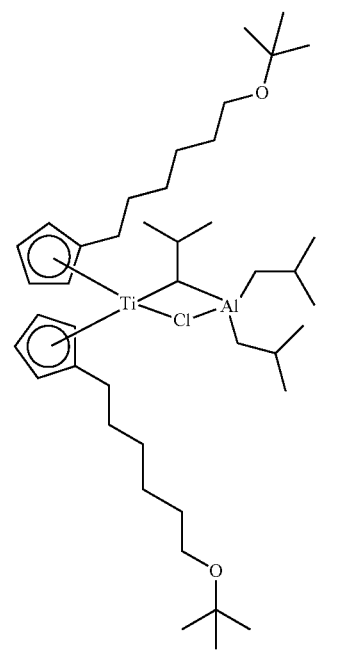

Further, the molecular weight modifier produced by reaction of the cyclopentadienyl metal compound of Chemical Formula 3 and the organic aluminum compound of Chemical Formula 4 may be represented by the following Chemical Formula 8.

[Chemical Formula 8]

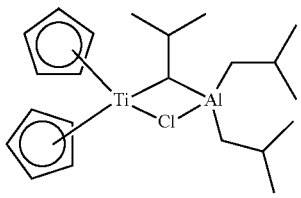

In the preparation method of an embodiment, a polyolefin is prepared by polymerizing olefin monomers in the presence of a molecular weight modifier including a mixture of the cyclopentadienyl metal compound of Chemical Formula 1 or Chemical Formula 3 and the organic aluminum compound of Chemical Formula 2 or Chemical Formula 4, or a reaction product thereof, for example, an organic metal complex produced by reacting the compounds of Chemical Formula 1 and Chemical Formula 2 or the compounds of Chemical Formula 3 and Chemical Formula 4, respectively.

The experimental results of the present inventors showed that the specific molecular weight modifier does not exhibit a catalytic activity for olefin polymerization in itself, but aids activity of the metallocene catalyst to allow preparation of a polyolefin having a higher molecular weight and a wider molecular weight distribution. The mechanism of action of the molecular weight modifier has not been clarified, but it is assumed that the molecular weight modifier interacts with the metallocene catalyst to increase the active site to which monomers come close, thereby improving polymerization activity and preparing a polyolefin having a higher molecular weight and a wider distribution.

Owing to the action of the molecular weight modifier, when a polyolefin is prepared, for example, in a cascade reactor described below, although a relatively large amount of the metallocene catalyst is consumed in the former reactor, polymerization of olefin monomers effectively occurs in the latter reactor, thereby preparing a polyolefin having a higher molecular weight and a wider multimodal molecular weight distribution.

In particular, the molecular weight modifier including specific substituents in the cyclopentadienyl group of Chemical Formula 1 or Chemical Formula 3 and the organic functional group of Chemical Formula 2 or Chemical Formula 4 shows remarkably improved solubility, compared to the known molecular weight modifiers, and therefore it may be fed with excellent homogeneity, thereby showing excellent polymerization performance.

Further, the cascade polymerization reaction for the preparation of polyolefin for blow-molding is mainly performed in an aliphatic hydrocarbon-based organic solvent such as hexane, etc. by slurry phase polymerization or solution polymerization. Since the molecular weight modifier is formed from the organic aluminum compound of Chemical Formula 2 having an alkyl group of 4 or more carbon atoms, it exhibits excellent solubility for the aliphatic hydrocarbon-based organic solvent such as hexane, etc. Therefore, the molecular weight modifier may be stably dissolved in the organic solvent used as a reaction medium or diluent to be fed into a reaction system, and it may exhibit more uniform and excellent action and effect during polymerization. Further, although the aliphatic hydrocarbon-based organic solvent such as hexane, etc. is used as a reaction medium, a polyolefin having excellent physical properties may be prepared. Thus, there is no need to use an aromatic hydrocarbon-based organic solvent, and there is no concern about odor or taste caused by the aromatic hydrocarbon-based organic solvent remaining in polyolefins or products. Consequently, the polyolefin prepared according to an embodiment may be very suitably applied to food containers, etc.

Therefore, according to an embodiment, the polyolefin thus prepared has a higher molecular weight and a wider multimodal molecular weight distribution, thereby showing excellent mechanical properties and processability, and being effectively used for blow-molding.

Hereinafter, the method of preparing a polyolefin will be described in more detail.

In the preparation method of an embodiment, any olefin monomer may be polymerized to prepare the polyolefin. In this regard, specific examples of the useful olefin monomer may include ethylene, propylene, 1-butene, 1-hexene, 1-octene, 1-pentene, 4-methyl-1-pentene, 1-hexene, 1-heptene, 1-decene, 1-undecene, 1-dodecene, norbornene, ethylidene norbornene, styrene, alpha-methylstyrene, and 3-chloromethylstyrene. However, in an example of the preparation method, ethylene is used to prepare polyethylene, or ethylene is used together with an alpha-olefin such as propylene, 1-butene, 1-hexene, 1-octene, 1-pentene, 4-methyl-1-pentene, 1-hexene, 1-heptene, 1-decene, 1-undecene, or 1-dodecene to perform copolymerization, thereby preparing an ethylene-alpha olefin copolymer. In this regard, the comonomer such as alpha-olefin may be used in an amount of 30% by weight or less, or about 0 to 20% by weight, or about 0.1 to 15% by weight, based on the total weight of the olefin monomer, thereby being copolymerized. As this amount of alpha-olefin is used for copolymerization, the final polyolefin may exhibit excellent environmental stress-cracking resistance within the density range suitable for blow-molding. However, if an excessively large amount of alpha-olefin is used, density of the polymer may be decreased to cause a reduction in flexural strength.

The metallocene catalyst used in the preparation method of an embodiment may be used in the form of a supported catalyst prepared by supporting a metallocene compound on a support or in the form of a non-supported catalyst without an additional support.

Further, the metallocene catalyst including a hybrid of two or more different metallocene compounds or only a single metallocene compound may be used. In particular, the metallocene catalyst may include one or more metallocene compounds represented by any one of the following Chemical Formulae 9 to 12:

$$(Cp^5R^a)_n(Cp^6R^b)M^3Z^1_{3-n}$$ [Chemical Formula 9]

wherein $M^3$ is a Group 4 transition metal;

$Cp^5$ and $Cp^6$ are the same as or different from each other, and are each independently any one selected from the group consisting of cyclopentadienyl, indenyl, 4,5,6,7-tetrahydro-1-indenyl, and fluorenyl radicals, and these may be substituted with a hydrocarbon having 1 to 20 carbon atoms;

$R^a$ and $R^b$ are the same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;

$Z^1$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy; and n is 1 or 0;

$(Cp^7R^c)_m B^1(Cp^8R^d)M^4Z^2_{3-m}$ [Chemical Formula 10]

wherein $M^4$ is a Group 4 transition metal;

$Cp^7$ and $Cp^8$ are the same as or different from each other, and are each independently any one selected from the group consisting of cyclopentadienyl, indenyl, 4,5,6,7-tetrahydro-1-indenyl, and fluorenyl radicals, and these may be substituted with a hydrocarbon having 1 to 20 carbon atoms;

$R^c$ and $R^d$ are the same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;

$Z^2$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy;

$B^1$ is any one or more of carbon, germanium, silicon, phosphorus, and nitrogen atom-containing radicals, which crosslink a $Cp^3R^c$ ring and a $Cp^4R^d$ ring or crosslinks one $Cp^4R^d$ ring to $M^2$, or a combination thereof; and m is 1 or 0;

$(Cp^9R^e)B^2(J)M^5Z^3_2$ [Chemical Formula 11]

wherein $M^5$ is a Group 4 transition metal;

$Cp^9$ is any one selected from the group consisting of cyclopentadienyl, indenyl, 4,5,6,7-tetrahydro-1-indenyl, and fluorenyl radicals, and these may be substituted with a hydrocarbon having 1 to 20 carbon atoms;

$R^e$ is hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;

$Z^3$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy;

$B^2$ is any one or more of carbon, germanium, silicon, phosphorus, and nitrogen atom-containing radicals, which crosslink a $Cp^5R^e$ ring to J, or a combination thereof; and J is any one selected from the group consisting of $NR^f$, O, $PR^f$, and S, and $R^f$ is a C1 to C20 alkyl, aryl, substituted alkyl, or substituted aryl,

[Chemical Formula 12]

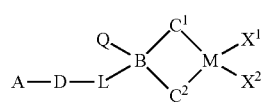

wherein A is hydrogen, a halogen, a C1 to C20 alkyl, a C2 to C20 alkenyl, a C6 to C20 aryl, a C7 to C20 alkylaryl, a C7 to C20 arylalkyl, a C1 to C20 alkoxy, a C2 to C20 alkoxyalkyl, a C3 to C20 heterocycloalkyl, or a C5 to C20 heteroaryl;

D is —O—, —S—, —N(R)—, or —Si(R)(R')—, in which R and R' are the same as or different from each other, and are each independently hydrogen, a halogen, a C1 to C20 alkyl, a C2 to C20 alkenyl, or a C6 to C20 aryl;

L is a C1 to C10 straight or branched alkylene;

B is carbon, silicon, or germanium;

Q is hydrogen, a halogen, a C1 to C20 alkyl, a C2 to C20 alkenyl, a C6 to C20 aryl, a C7 to C20 alkylaryl, or a C7 to C20 arylalkyl;

M is a Group 4 transition metal;

$X^1$ and $X^2$ are the same as or different from each other, and are each independently a halogen, a C1 to C20 alkyl, a C2 to C20 alkenyl, a C6 to C20 aryl, a nitro group, an amido group, a C1 to C20 alkylsilyl, a C1 to C20 alkoxy, or a C1 to C20 sulfonate;

$C^1$ and $C^2$ are the same as or different from each other, and are each independently represented by any one of the following Chemical Formula 13a, Chemical Formula 13b, and Chemical Formula 13c, excluding that both $C^1$ and $C^2$ are Chemical Formula 13c;

[Chemical Formula 13a]

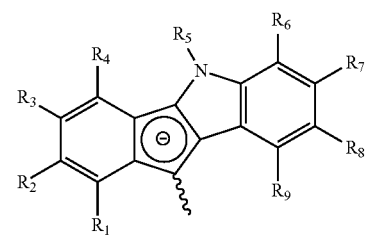

[Chemical Formula 13b]

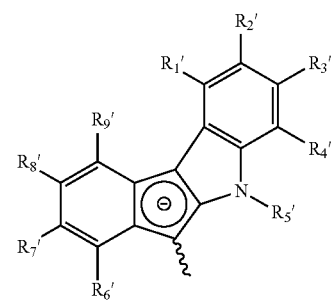

[Chemical Formula 13c]

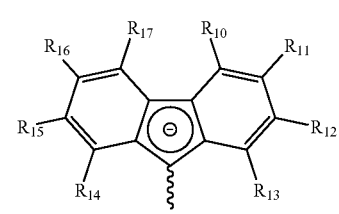

wherein R1 to R17 and R1' to R9' are the same as or different from each other, and are each independently hydrogen, a halogen, a C1 to C20 alkyl, a C2 to C20 alkenyl, a C1 to C20 alkylsilyl, a C1 to C20 silylalkyl, a C1 to C20 alkoxysilyl, a C1 to C20 alkoxy, a C6 to C20 aryl, a C7 to C20 alkylaryl, or a C7 to C20 arylalkyl, and two or more neighboring groups of R10 to R17 are connected to each other to form a substituted or unsubstituted aliphatic or aromatic ring.

Examples of the metallocene compound represented by Chemical Formula 9 may be a compound represented by any one of the following structural formulae, but are not limited thereto.

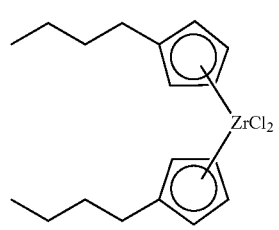
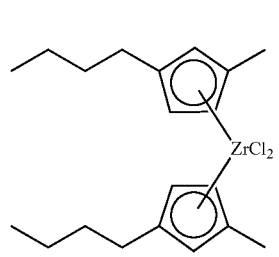
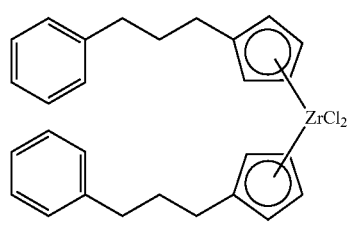
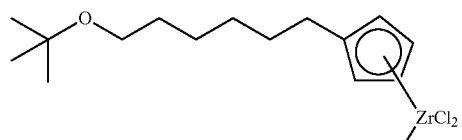
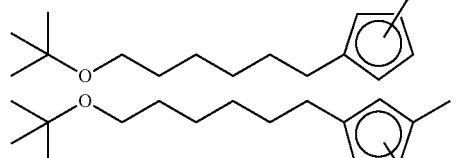
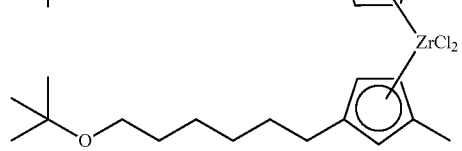
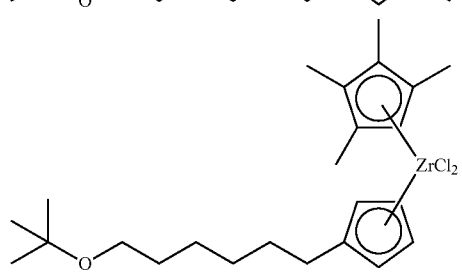
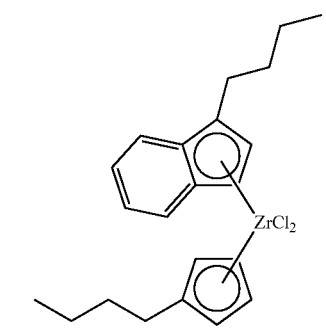
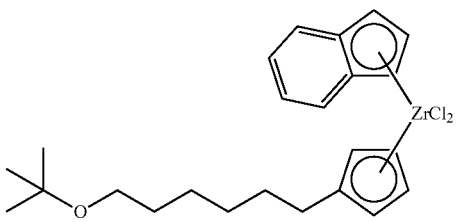
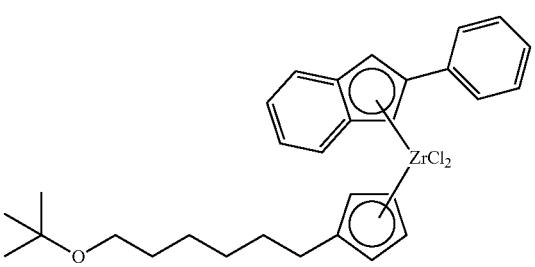
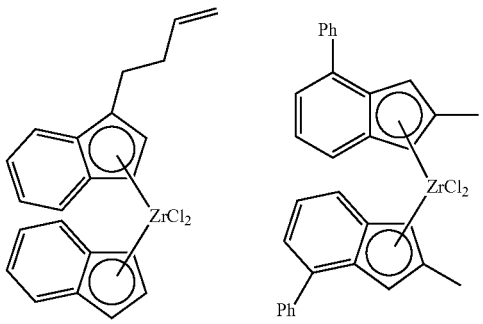
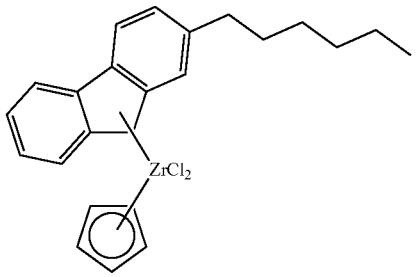
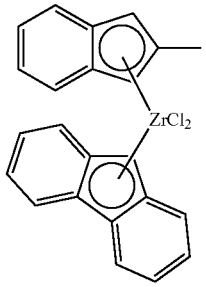

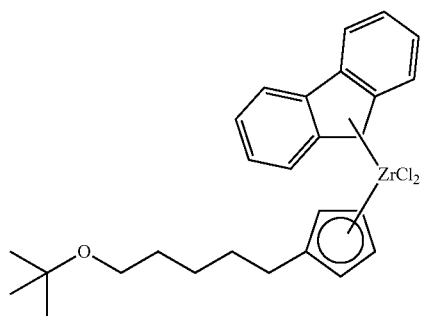
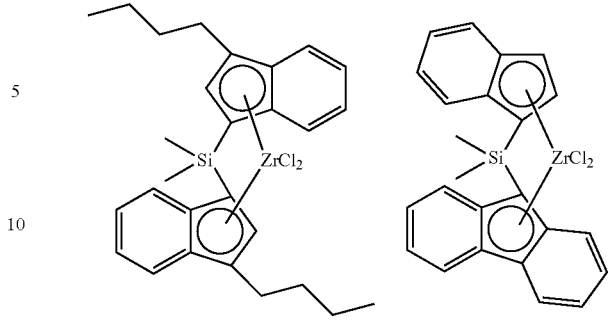
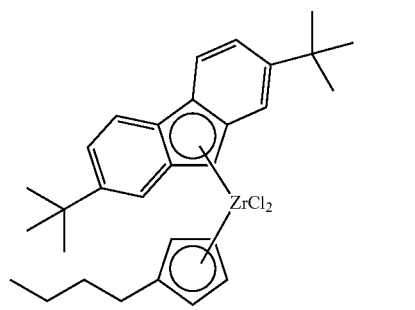
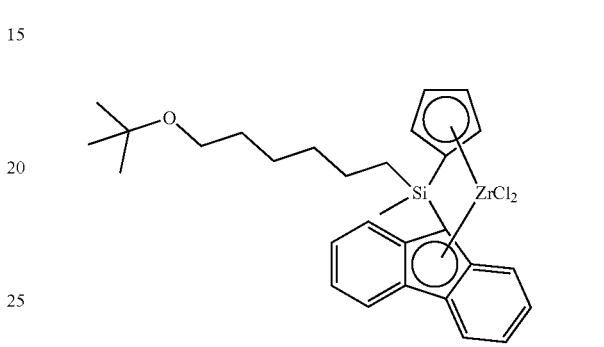
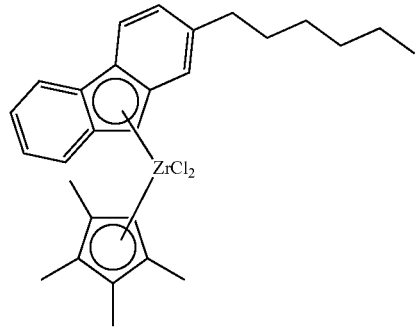
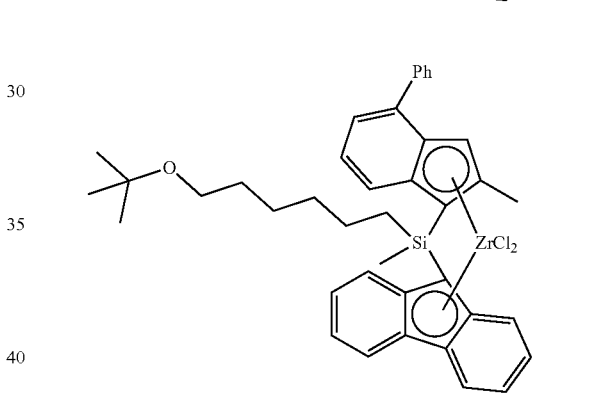
Further, examples of the compound represented by Chemical Formula 10 may be a compound represented by any one of the following structural formulae, but are not limited thereto.
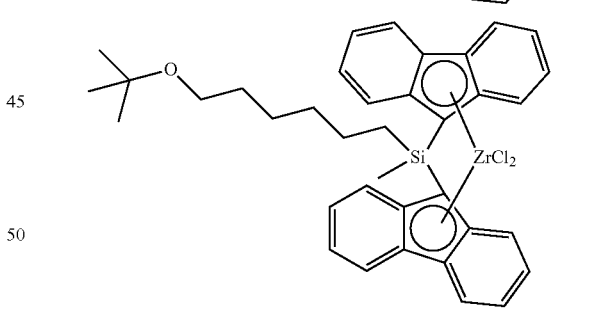
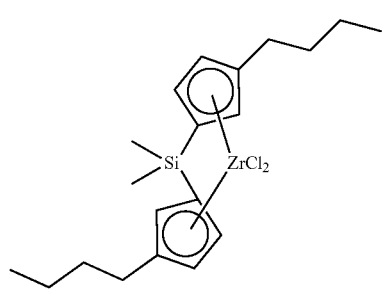
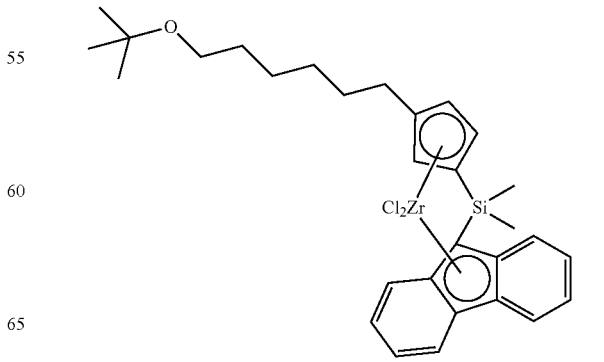
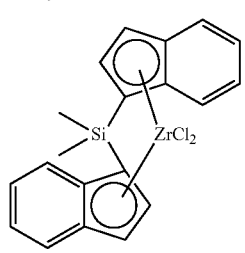
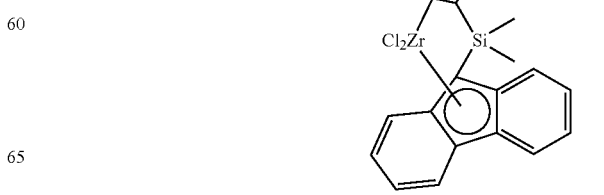

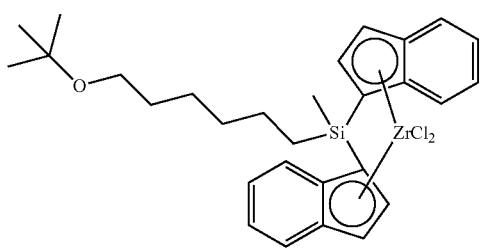
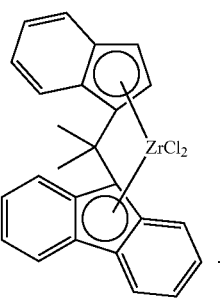
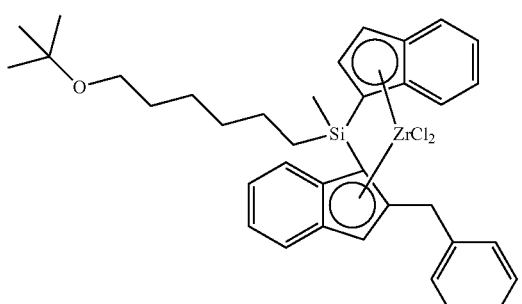
Further, examples of the compound represented by Chemical Formula 11 may be a compound represented by any one of the following structural formulae, but are not limited thereto.
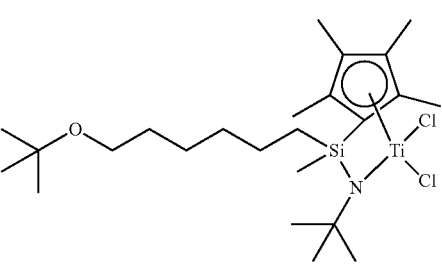
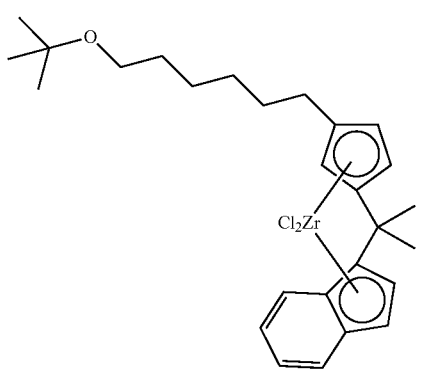
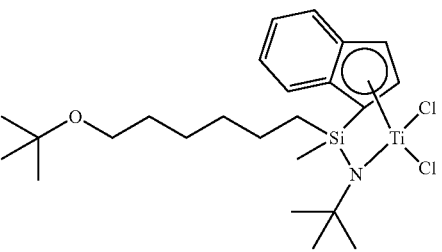
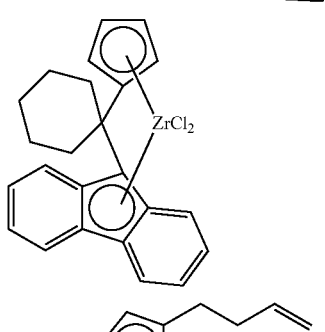
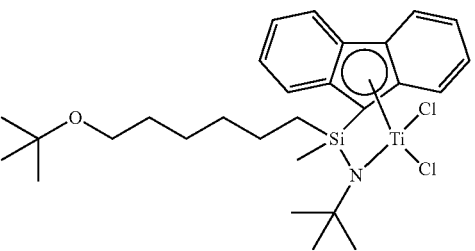
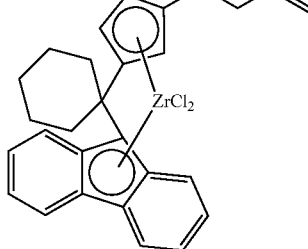
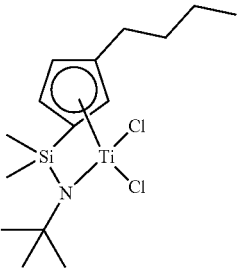

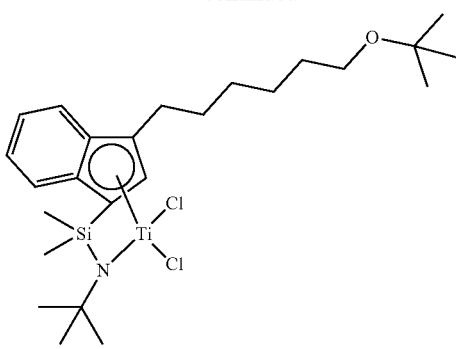

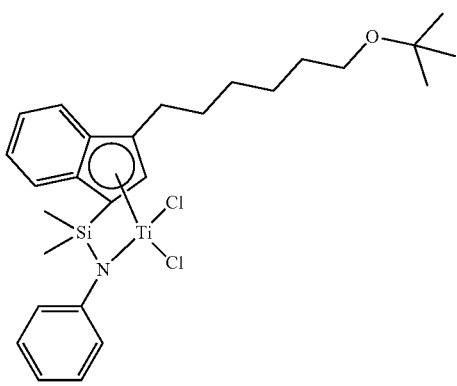

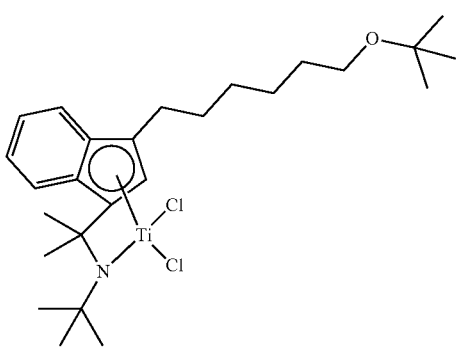

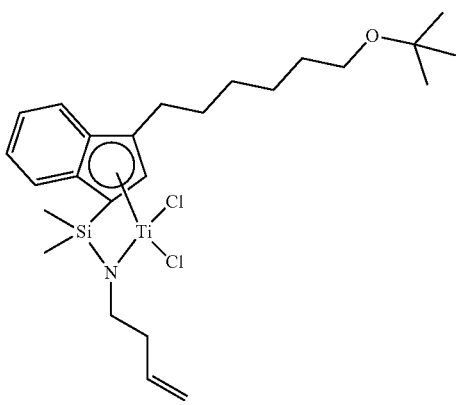

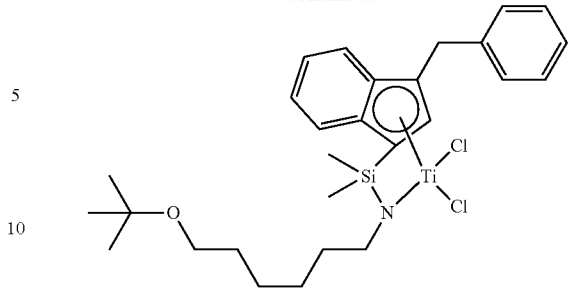

Further, in Chemical Formula 12, the Group 4 transition metal (M) may be exemplified by titanium, zirconium, or hafnium, but is not limited thereto.

In the metallocene compound of Chemical Formula 12, R1 to R17 and R1' to R9' of Chemical Formulae 13a, 13b, and 13c are each independently hydrogen, a methyl, an ethyl, a propyl, an isopropyl, an n-butyl, a tert-butyl, a pentyl, a hexyl, a heptyl, an octyl, a phenyl, a halogen, a trimethylsilyl, a triethylsilyl, a tripropylsilyl, a tributylsilyl, a triisopropylsilyl, a trimethylsilylmethyl, a methoxy, or an ethoxy, but are not limited thereto.

In the metallocene compound of Chemical Formula 12, L is more preferably a C4 to C8 straight or branched alkylene, but is not limited thereto. Further, the alkylene group may be substituted or unsubstituted with a C1 to C20 alkyl, a C2 to C20 alkenyl, or a C6 to C20 aryl.

In the metallocene compound of Chemical Formula 12, A is preferably hydrogen, a methyl, an ethyl, a propyl, an isopropyl, an n-butyl, a tert-butyl, a methoxymethyl, a tert-butoxymethyl, a 1-ethoxyethyl, a 1-methyl-1-methoxyethyl, a tetrahydropyranyl, or a tetrahydrofuranyl, but is not limited thereto. Further, B is preferably silicon, but is not limited thereto.

The metallocene compound of Chemical Formula 12 may form a structure in which an indeno indole derivative and/or a fluorene derivative are/is crosslinked by a bridge, and it has an unshared electron pair which may function as a Lewis base in a ligand structure, and thus is supported on the surface having a Lewis acid property of a support, thereby showing high polymerization activity when supported. Further, since the metallocene compound includes the electron-rich indeno indole group and/or fluorene group, it has high activity and low hydrogen reactivity due to proper steric hindrance and electronic effect of the ligand, and also maintains high activity even in the presence of hydrogen. Further, the nitrogen atom of the indeno indole derivative stabilizes beta-hydrogen of a growing polymer chain by a hydrogen bond to inhibit beta-hydrogen elimination, thereby polymerizing an olefin polymer having a very high molecular weight.

According to an embodiment of the present invention, a specific example of the structure represented by Chemical Formula 13a may be exemplified by one of the following structural formulae, but is not limited thereto.

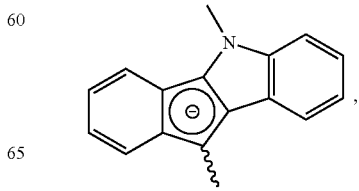

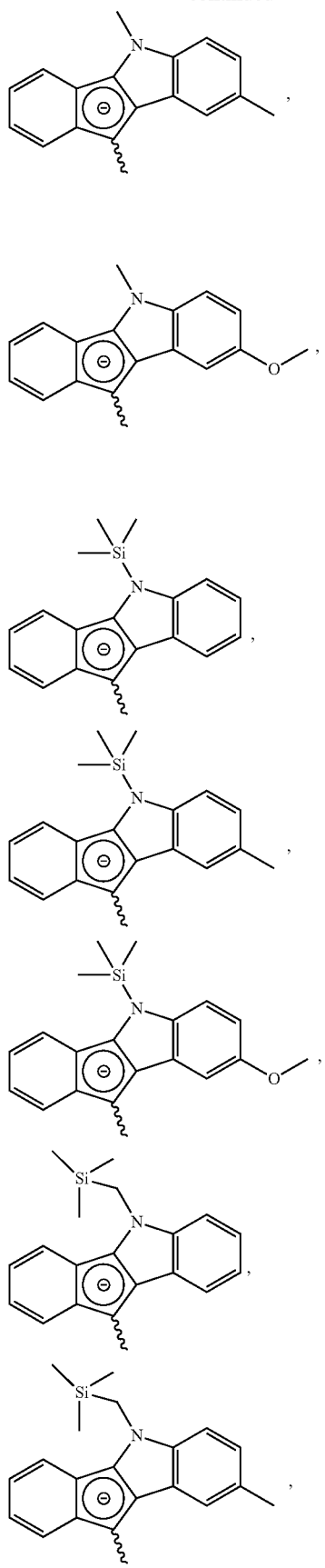
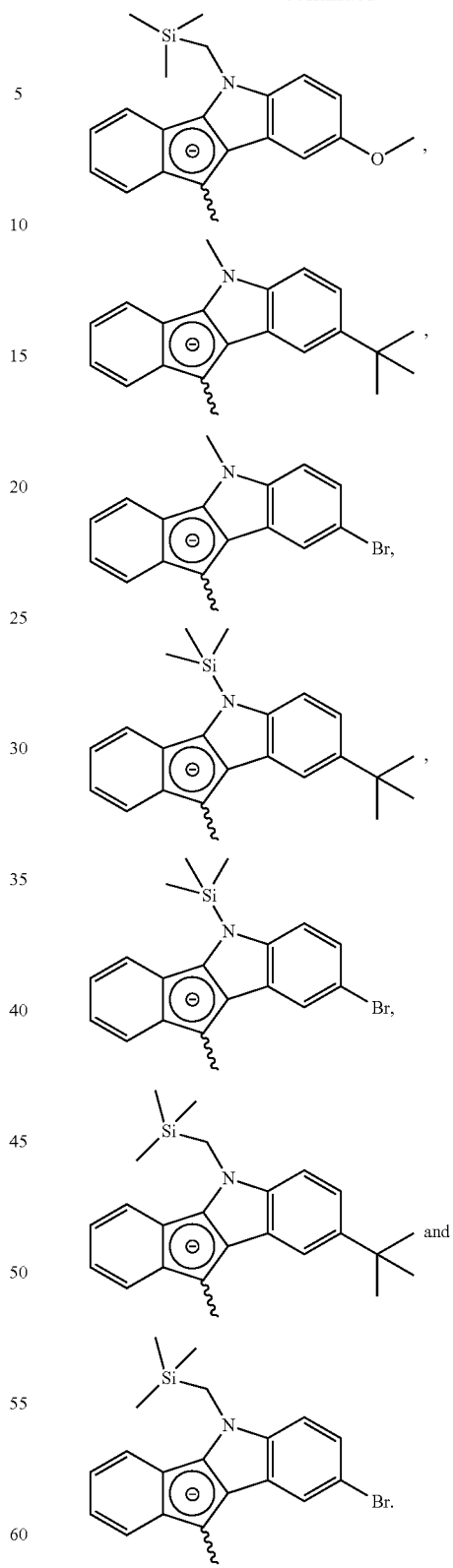
Further, a specific example of the structure represented by Chemical Formula 13b may be exemplified by one of the following structural formulae, but is not limited thereto.

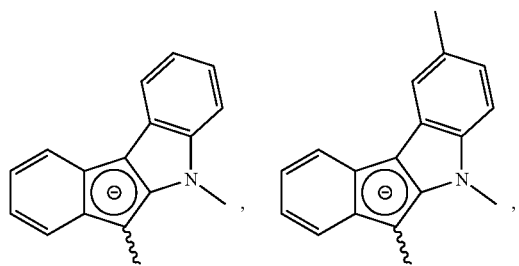
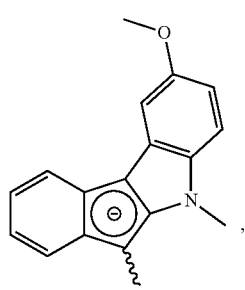
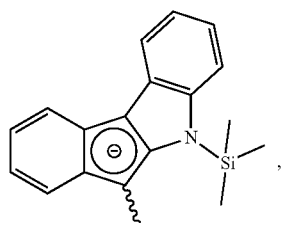
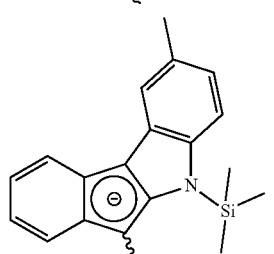
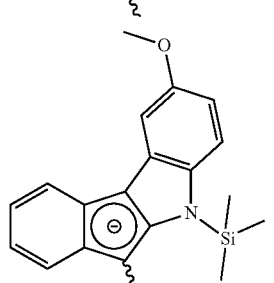
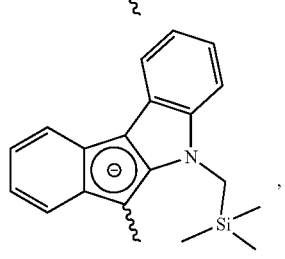
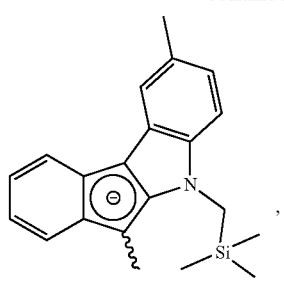
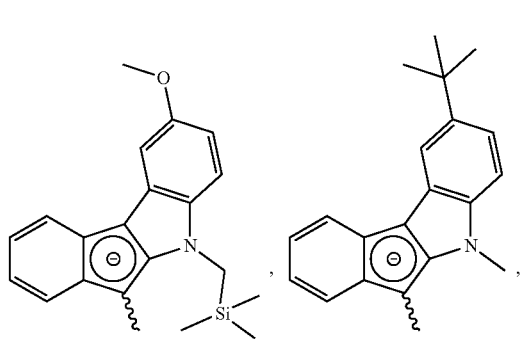
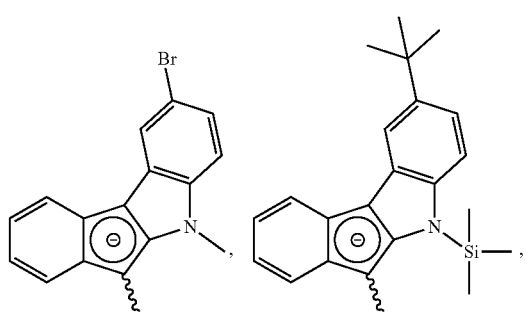
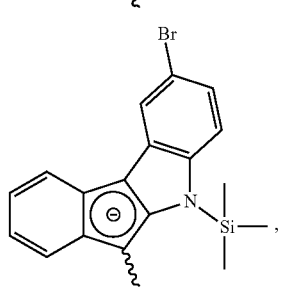
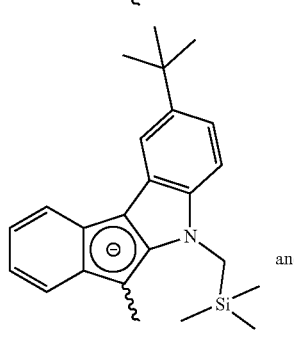
and -continued

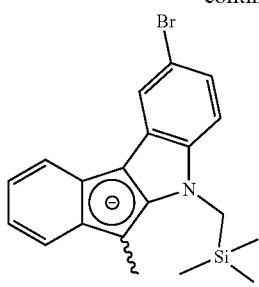

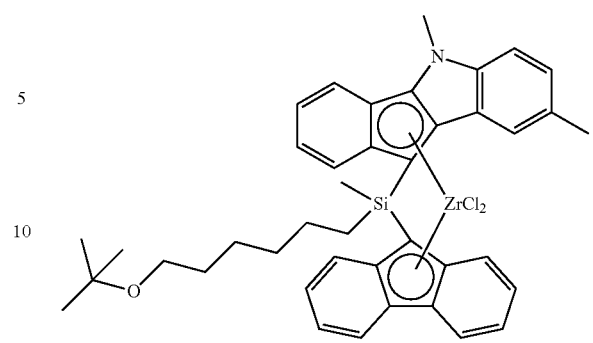

Further, a specific example of the structure represented by Chemical Formula 13c may be exemplified by one of the following structural formulae, but is not limited thereto:

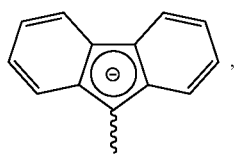

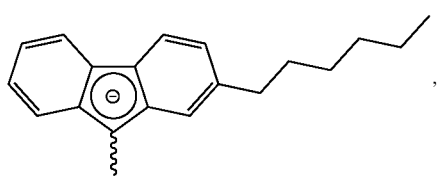

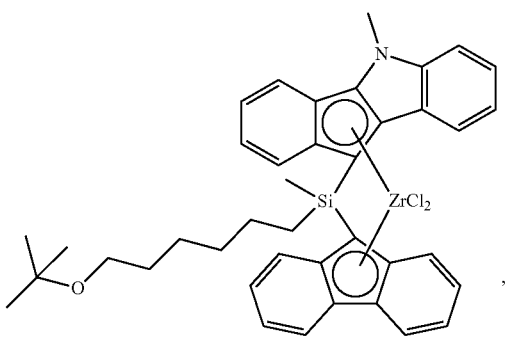

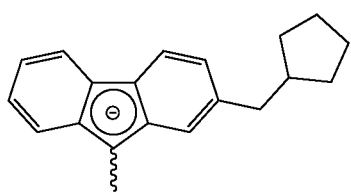

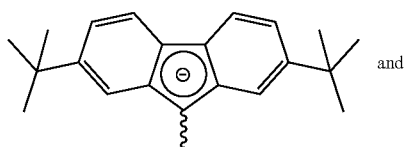

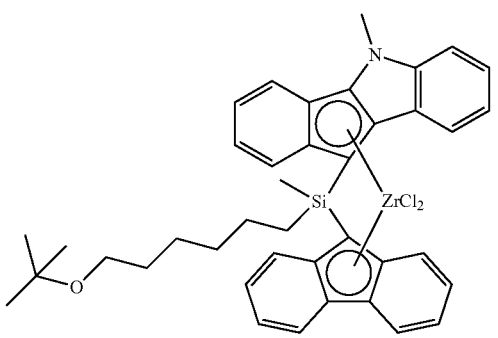

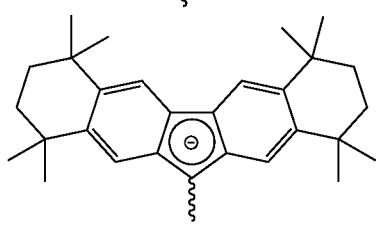

Further, a specific example of the metallocene compound represented by Chemical Formula 12 may be exemplified by one of the following structural formulae, but is not limited thereto.

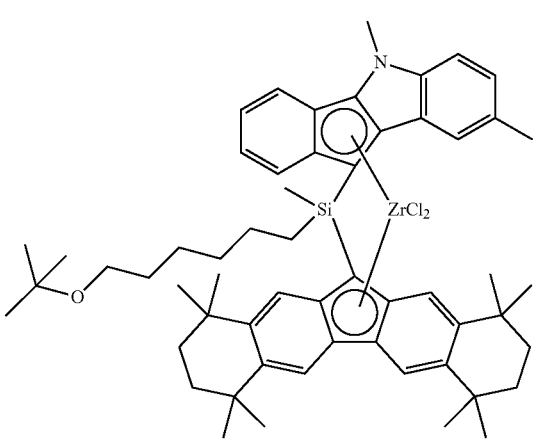

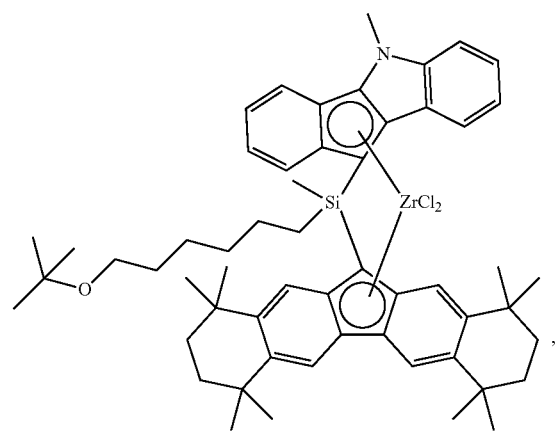
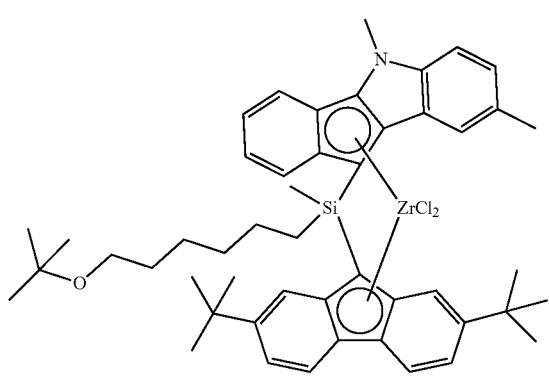
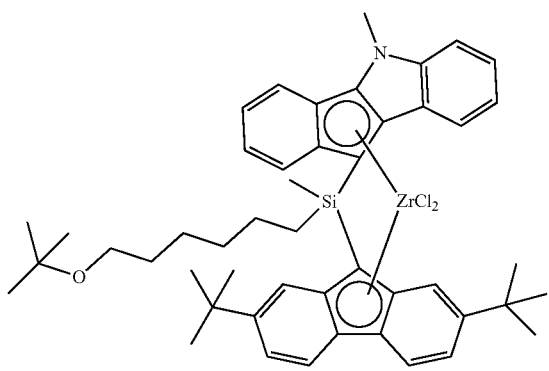
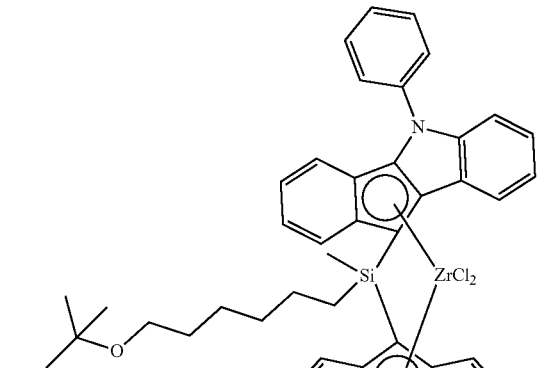
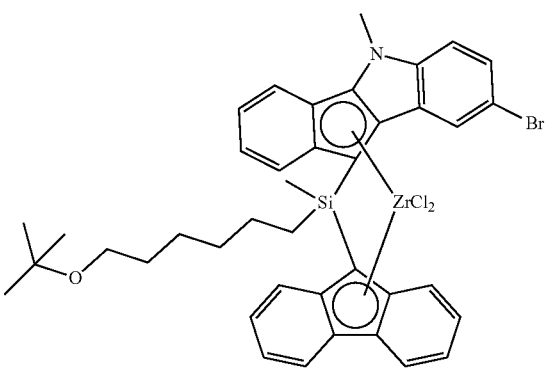
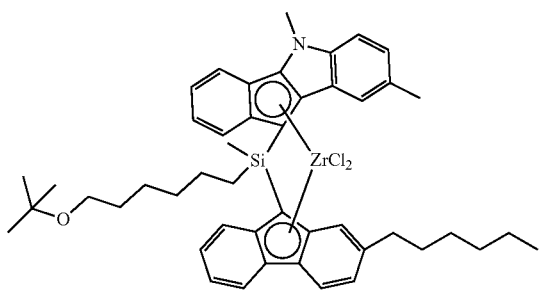
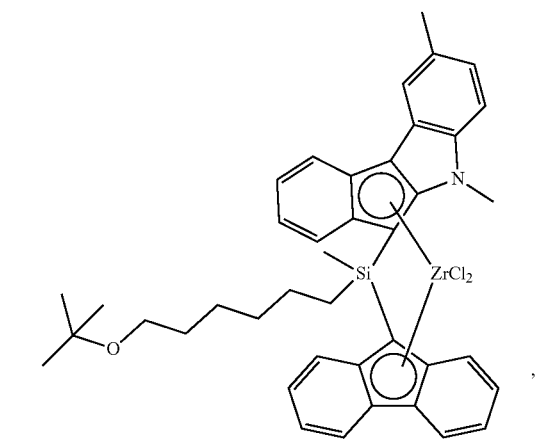
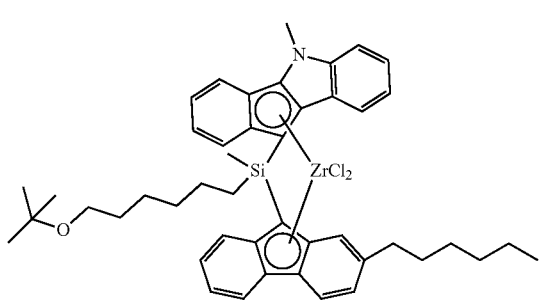

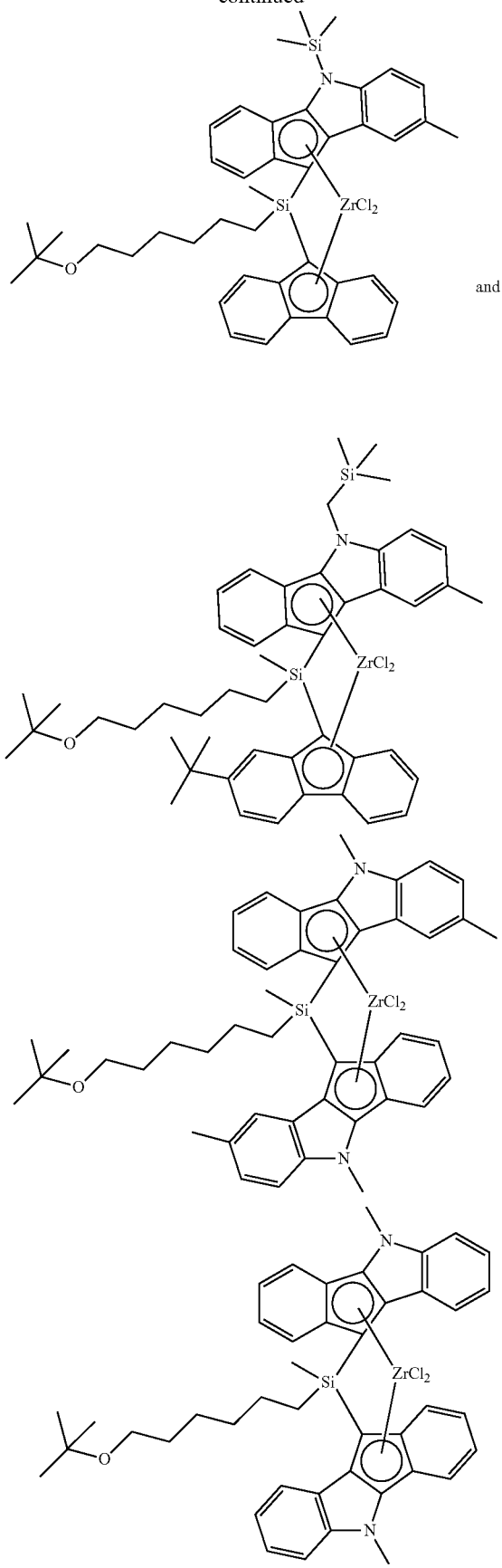
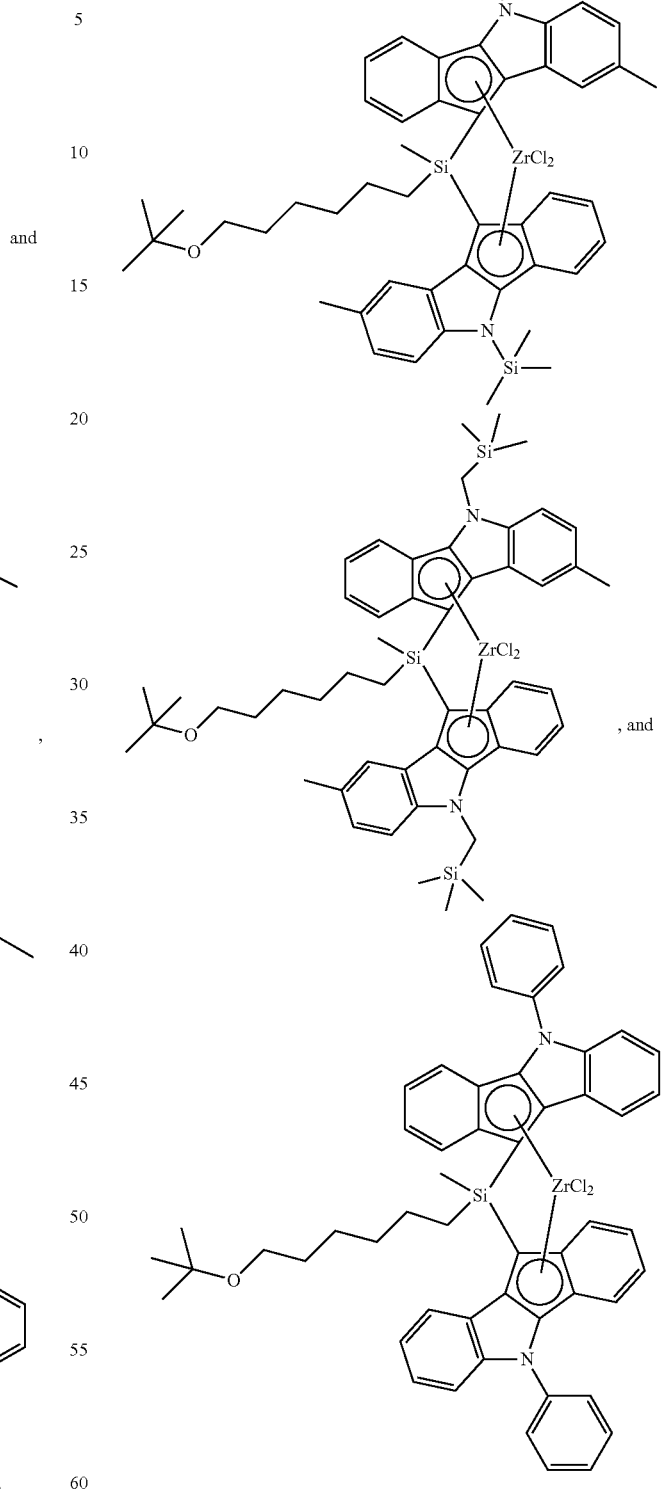
The metallocene compound of Chemical Formula 12 may be obtained by linking the indeno indole derivative and/or the fluorene derivative by a bridge compound to prepare a ligand compound, and then injecting a metal precursor compound thereto to perform metallation, but is not limited thereto.

Meanwhile, when the metallocene catalyst is used in the non-supported form, a polymer may be directly prepared by solution polymerization. In particular, when a molecular weight modifier including a mixture of the cyclopentadienyl group of Chemical Formula 3 and the organic aluminum compound of Chemical Formula 4 or a reaction product thereof is used, solution polymerization may be performed using the non-supported catalyst without additional support. When the solution polymerization process is performed, a paraffin-based solvent and an aromatic solvent may be used, for example, in the presence of one or more solvents selected from the group consisting of benzene, toluene, xylene, isobutane, pentane, hexane, and heptane.

Further, when the metallocene catalyst is used as a supported catalyst, it may be in the form of a supported metallocene catalyst, in which the metallocene compound and a cocatalyst are supported on a support, for example, in the form of a hybrid supported metallocene catalyst including two or more different metallocene compounds and the cocatalyst.

In this regard, the support may be silica, silica-alumina, silica-magnesia, etc. Any known support capable of supporting metallocene catalysts may be used. Further, a support dried at a high temperature may be used, and the drying temperature may be, for example, about 180 to 800° C. If the drying temperature is too low, an excessive amount of water on the support reacts with the cocatalyst to reduce performance, and if the drying temperature is too high, the amount of the hydroxyl group on the support surface becomes too low to reduce the reactive site with the cocatalyst.

Meanwhile, in the above-described metallocene catalyst, in particular, the hybrid supported metallocene catalyst, the cocatalyst may include a first aluminum-containing cocatalyst of the following Chemical Formula 14 and a second borate-based cocatalyst of the following Chemical Formula 15:

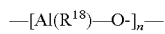  [Chemical Formula 14]

wherein each $R^{18}$ is independently halogen, or a halogen-substituted or unsubstituted hydrocarbyl having 1 to 20 carbon atoms, and n is an integer of 2 or more,

  [Chemical Formula 15]

wherein $T^+$ is a positive monovalent (+1) polyatomic ion, B is boron having an oxidation state of +3, each Q is independently selected from the group consisting of a hydride, a dialkylamido, a halide, an alkoxide, an aryloxide, a hydrocarbyl, a halocarbyl, and a halo-substituted-hydrocarbyl, in which Q has 20 or fewer carbon atoms, provided that only one or fewer of Q is a halide.

The final polyolefin prepared by use of the first and second cocatalysts may have more uniform molecular weight distribution, thereby improving the polymerization activity.

The first cocatalyst of Chemical Formula 14 may have a linear, circular, or net shape, and it may be an alkylaluminoxane-based compound having a repeating unit. Specific examples of the first cocatalyst may include methylaluminoxane (MAO), ethylaluminoxane, isobutylaluminoxane, butylaluminoxane, and the like.

Further, the second cocatalyst of Chemical Formula 15 may be a borate-based compound, such as tri-substituted ammonium salts, dialkyl ammonium salts, or tri-substituted phosphonium salts. Specific examples of the second cocatalyst may include tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium)tetrakis-(2,3,4,6-tetrafluorophenyl)borate; dialkyl ammonium salts, such as dioctadecylammonium tetrakis(pentafluorophenyl)borate, ditetradecylammonium tetrakis(pentafluorophenyl)borate, or dicyclohexylammonium tetrakis(pentafluorophenyl)borate; or tri-substituted phosphonium salts, such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

In the preparation of the hybrid supported metallocene catalyst using the first and second metallocene compounds of two or more of the above-described metallocene compounds and the first and second cocatalysts, it is preferable that the first metallocene compound and the first cocatalyst may be serially supported on the support, and subsequently, the second metallocene compound and the second cocatalyst may be serially supported. A washing step may be additionally performed using a solvent between the supporting steps.

Meanwhile, in the preparation method of an embodiment, olefin monomers may be polymerized in the presence of the above-described metallocene catalyst, and a molecular weight modifier including a mixture of the compounds of Chemical Formulae 1 and 2 or a reaction product thereof, or a molecular weight modifier including a mixture of the compounds of Chemical Formulae 3 and 4 or a reaction product thereof. The molecular weight modifier may include the compounds of Chemical Formulae 1 and 2 or the compounds of Chemical Formulae 3 and 4 in the form of an unreacted mixture thereof, or the compounds of Chemical Formulae 1 and 2 or the compounds of Chemical Formulae 3 and 4 in the form of a reaction product, for example, in the form of an organic metal complex, in which metal atoms of these compounds are connected to each other via X and/or any one of $R^1$, $R^2$, and $R^3$. In this regard, the molecular weight modifier may further include unreacted compound(s) of Chemical Formula 1 and/or Chemical Formula 2 or unreacted compound(s) of Chemical Formula 3 and/or Chemical Formula 4, together with the organic metal complex.

As described above, the molecular weight modifier aids the activity of the metallocene catalyst to allow polymerization with high activity in the presence of a relatively small amount of the metallocene catalyst and to prepare a polyolefin having a higher molecular weight and a wider multimodal molecular weight distribution.

In particular, when polyolefin is prepared in the cascade reactor described below, although a relatively large amount of the metallocene catalyst is consumed in the former reactor, polymerization of olefin monomers effectively occurs in the latter reactor to allow effective production of a polyolefin with a high molecular weight, thereby preparing the polyolefin which has a higher molecular weight and a wider multimodal molecular weight distribution and is suitable for blow-molding.

Furthermore, since the molecular weight modifier is formed from the organic aluminum compound of Chemical Formula 2 having an alkyl group of 4 or more carbon atoms, it may exhibit excellent solubility for the aliphatic hydrocarbon-based organic solvent such as hexane, etc. which is used as a reaction medium or diluent of the polymerization. Therefore, the molecular weight modifier may be stably dissolved in the reaction medium or diluent to be fed into a reaction system, and it may exhibit more uniform and excellent action and effect during polymerization.

Meanwhile, in the molecular weight modifier, specific examples of the cyclopentadienyl-based metal compound of Chemical Formula 1 may include bis(2-ethylcyclopenta-2,4-dien-1-yl)titanium dichloride, bis(2-butylcyclopenta-2,4-dien-1-yl)titanium dichloride, bis(2-(6-t-butoxy-hexyl)cyclopenta-2,3-dien-1-yl)titanium dichloride, bis(2-ethylcyclopenta-2,4-dien-1-yl)zirconium dichloride, bis(2-ethylcyclopenta-2,4-dien-1-yl)hafnium dichloride, or the like. Specific examples of the cyclopentadienyl-based metal compound of Chemical Formula 3 may include biscyclopentadienyl titanium dichloride, biscyclopentadienyl zirconium dichloride, biscyclopentadienyl hafnium dichloride, bisindenyl titanium dichloride, bisfluorenyl titanium dichloride, or the like. Specific examples of the organic aluminum compounds of Chemical Formula 2 and Chemical Formula 4 may include triisobutyl aluminum, trihexylaluminum, trioctyl aluminum, diisobutylaluminum chloride, dihexylaluminum chloride, isobutylaluminum dichloride, or the like.

Further, the compound of Chemical Formula 1 or Chemical Formula 3 and the compound of Chemical Formula 2 or Chemical Formula 4 are preferably used at a molar ratio of a metal element (M) included in Chemical Formula 1 or Chemical Formula 3 to aluminum (Al) included in Chemical Formula 2 or Chemical Formula 4 of about 1:0.1 to 1:100, or about 1:0.5 to 1:10.

Further, the molecular weight modifier may be used in an amount of about $10^{-7}$ to $10^{-1}$ parts by weight, or about $10^{-5}$ to $10^{-2}$ parts by weight, based on a total of 100 parts by weight of the olefin monomer. When the molecular weight modifier is used in an amount within the above range, the action and effect due to addition of the molecular weight modifier are optimized to obtain a polyolefin having a low polymer melt index, a wide molecular weight distribution, a high molecular weight, and more improved environmental stress-cracking resistance, considering density or polymer melt index.

Additionally, the above-described polymerization method of an embodiment may be performed, for example, in an aliphatic hydrocarbon-based solvent such as hexane, butane, pentane, etc. by slurry phase polymerization or solution polymerization. As described above, since the molecular weight modifier as well as the metallocene catalyst exhibits excellent solubility for the solvent, they may be stably solubilized and fed into the reaction system to allow an effective polymerization process and to effectively prepare the polyolefin having a high molecular weight and a wider molecular weight distribution.

The above-described polymerization method of an embodiment may be performed in a cascade-CSTR reactor including first and second reactors. A schematic illustration of the cascade-CSTR reactor and a schematic flow of a polymerization process using the same are shown in FIG. 1.

In the cascade reactor, the metallocene catalyst and olefin monomers are fed into the first reactor to prepare and polymerize a low-molecular weight polyolefin, and the molecular weight modifier and olefin monomers (optionally, comonomers) are fed into the second reactor to polymerize a high molecular weight polyolefin. In particular, by using the specific molecular weight modifier described above in the second reactor, although a relatively large amount of the metallocene catalyst is consumed in the first reactor and a relatively small amount thereof is transferred to the second reactor, excellent polymerization activity is maintained in the second reactor, thereby preparing the polyolefin having a higher molecular weight and a wider multimodal molecular weight distribution.

Each step of the method of polymerizing the polyolefin using the cascade-CSTR reactor will be described in detail as follows.

As the metallocene catalyst fed into the first reactor, various catalysts as described above may be used, and olefin monomers such as ethylene may be fed, and therefore polymerization may occur. Further, an inert gas, for example, nitrogen gas, optionally together with hydrogen gas, may be fed into the first reactor, and the polymerization may occur in the presence of the inert gas.

In this regard, the nitrogen gas functions to inhibit abrupt reaction of the metallocene catalyst at the early stage of the polymerization in the first reactor, and as a result, a certain amount of the metallocene catalyst may be transferred to the second reactor. Therefore, polymerization activity is maintained longer in the second reactor to produce a larger amount of high molecular weight polyolefin in the second reactor. Accordingly, the polyolefin having a higher molecular weight and a wider molecular weight distribution may be effectively obtained by using the inert gas such as nitrogen gas.

The inert gas may be fed in a weight ratio of inert gas to olefin monomer of about 1:10 to 1:100. If an excessively small amount of inert gas is used, sufficient catalytic activity is not achieved in the second reactor, and therefore it is difficult to prepare a polyolefin having the desired molecular weight and molecular weight distribution. If an excessively large amount of inert gas is used, sufficient catalytic activity is not achieved in the first reactor.

Further, the hydrogen gas may be used in an amount of about 0 to 5% by weight, based on the total weight of the olefin monomer, and it functions to control the molecular weight and molecular weight distribution of the low molecular weight polyolefin produced in the first reactor.

Meanwhile, an organic aluminum compound is further fed into the first and second reactors in order to remove water in the reactors, and individual polymerization reactions may be performed in the presence of the organic aluminum compound. Specific examples of the organic aluminum compound may include trialkyl aluminum, dialkyl aluminum halide, alkyl aluminum dihalide, aluminum dialkyl hydride, alkyl aluminum sesquihalide, or the like, and more specific examples thereof may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2$ AlCl, (i-C$_3$H$_9$)$_2$AlCl, (C$_2$H$_5$)$_3$Al$_2$Cl$_3$, or the like. These organic aluminum compounds may be fed into each reactor in a continuous manner, and for proper removal of water, they may be fed at a ratio of about 0.1 to 10 mol per 1 kg of the reaction medium fed into each reactor.

As long as the polyolefin having the proper molecular weight distribution and density distribution may be produced, each retention time of the raw materials in the first reactor is not particularly limited. The retention time may be about 1 to 3 hours (h). If the retention time in the first reactor is below the range, a low molecular weight polyolefin is not properly formed, and the molecular weight distribution becomes narrow to reduce processability of the final polyolefin. On the contrary, if the retention time in the first reactor is above the range, it is not preferred in terms of productivity.

The polymerization temperature in the first reactor may be about 70 to 90° C. If the polymerization temperature is too low, it is not preferred in terms of polymerization rate and productivity. If the polymerization temperature is too high, reactor fouling may occur.

The polymerization pressure in the first reactor may be about 8 to 10 bar in order to maintain a stable continuous process.

The reaction mixture including the olefin monomer and the metallocene catalyst in the first reactor may further include an organic solvent as a reaction medium or diluent. The organic solvent may be the above-described aliphatic hydrocarbon-based solvent, and this reaction medium may be used in an amount suitable for slurry phase polymerization, considering the content of the olefin monomer.

The polyolefin produced in the first reactor may be a low molecular weight polyolefin having a weight average molecular weight of about 10,000 to 100,000, a molecular weight distribution of about 1.5 to 5.0, and a melt index of about 10 to 1000 under conditions of 5 kg and 190° C. The low molecular weight polyolefin produced in the first reactor may be produced at a ratio of about 40 to 70% by weight with respect to the total weight of the final polyolefin.

Meanwhile, after polymerization in the first reactor, the above-described molecular weight modifier and olefin monomers may be added to a slurry mixture transferred from the first reactor to perform a polymerization process, thereby preparing a high molecular weight polyolefin. In this regard, ethylene, and one or more comonomers selected from the group consisting of propylene, 1-butene, 1-hexene, 1-octene, 1-pentene, 4-methyl-1-pentene, 1-hexene, 1-heptene, 1-decene, 1-undecene, 1-dodecene, norbornene, ethylidene norbornene, styrene, alpha-methylstyrene, and 3-chloromethylstyrene, may be further fed into the second reactor.

In this second reactor, polymerization may occur in the presence of the metallocene catalyst remaining in the slurry mixture without additional injection of the metallocene catalyst, and in this case, a high molecular weight polyolefin may also be properly produced due to interaction with the molecular weight modifier, thereby finally preparing the polyolefin having a higher molecular weight and a wider molecular weight distribution.

As long as a polyolefin having the proper molecular weight distribution and density distribution may be produced, each retention time of the raw materials in the second reactor is not particularly limited. The retention time may be about 1 to 3 h. If the retention time in the second reactor is below this range, a high molecular weight polyolefin is not properly formed, thereby reducing environmental stress-cracking resistance or mechanical properties of the final polyolefin. On the contrary, if the retention time in the second reactor is above the range, it is not preferred in terms of productivity.

The polymerization temperature in the second reactor may be about 60 to 90° C. If the polymerization temperature is too low, it is not preferred in terms of polymerization rate and productivity. If the polymerization temperature is too high, reactor fouling may occur. The polymerization temperature in the second reactor may be controlled in the range of about 0 to −20° C., with respect to the temperature of the first reactor. Therefore, it is easy to transfer the slurry mixture from the first reactor to the second reactor and to easily control the molecular weight of polyolefin in the second reactor.

The polymerization pressure in the second reactor may be about 6 to 9 bar in order to maintain a stable continuous process. The polymerization pressure in the second reactor may be controlled in the range of about 0 to −3 bar, with respect to the pressure of the first reactor. That is, the polymerization pressure in the second reactor may be controlled to be about 3 to 9 bar. Therefore, it is easy to transfer the slurry mixture from the first reactor to the second reactor and to minimize a reduction in the reaction activity due to reduced pressure.

The aliphatic hydrocarbon-based solvent may be used as a reaction medium or diluent for proper slurry phase polymerization in the second reactor, like in the first reactor.

The polyolefin produced in the second reactor may be a high molecular weight polyolefin having a weight average molecular weight of about 150,000 to 300,000, a molecular weight distribution of about 5 to 20, and a melt index of about 0.1 to 10 under conditions of 5 kg and 190° C. The high molecular weight polyolefin produced in the second reactor may be produced at a ratio of about 30 to 60% by weight with respect to the total weight of the final polyolefin.

Further, the above-described cascade-CSTR reactor may further include a post reactor for additional polymerization of unreacted monomers in the slurry mixture which is transferred from the second reactor, and through this process, the polyolefin may be finally prepared.

According to the present invention, the molecular weight of the polymer may be effectively increased and high activity may also be maintained during polymerization of the olefin. In the method of preparing the polyolefin of the present invention, in particular, the catalytic activity may be 1.5 kg/gCat·h or higher, or 1.5 to 10 kg/gCat·h, preferably 1.65 kg/gCat·h or higher, and more preferably 1.8 kg/gCat·h, as calculated by the ratio of the weight (kg) of the produced polymer per weight (g) of the used catalyst per unit time (h). Specifically, in the preparation of a polyolefin by a solution polymerization process, the catalytic activity may be 5.3 kg/gCat·h or higher, preferably 5.5 kg/gCat·h or higher, and more preferably 5.8 kg/gCat·h or higher.

According to another aspect of the present invention, a polyolefin prepared by the above-described preparation method of an embodiment is provided. The polyolefin has a high molecular weight and multimodal molecular weight distribution, thereby being preferably used for blow-molding.

Owing to the action of the molecular weight modifier, the polyolefin according to the present invention may have a high molecular weight of about 100,000 to 2,000,000, or about 110,000 to 1,500,000, about 120,000 to 700,000, about 150,000 to 550,000, or about 200,000 to 450,000, and a wider bimodal or multimodal molecular weight distribution. When the polyolefin is prepared by slurry polymerization, the polyolefin may have a much higher molecular weight of about 250,000 or higher, about 280,000 or higher, about 300,000 or higher, or about 330,000 or higher. In addition, the polyolefin prepared by solution polymerization according to the present invention may have a melt index (MI 2.16 kg) of 15 g/10 min or less, or 0.01 to 15 g/10 min, preferably 3 g/10 min or less, more preferably 1 g/10 min or less. Further, the polyolefin prepared by slurry polymerization may have a melt index (MI 21.6 kg) of 15.0 g/10 min or less, or 0.01 to 15 g/10 min, preferably 10 g/10 min or less, more preferably 1 g/10 min or less. Due to the high molecular weight and wide multimodal molecular weight distribution, the polyolefin may exhibit excellent mechanical properties and processability at the same time. In particular, according to the present invention, a polyolefin having excellent mechanical properties such as ESCR (Environmental Stress-Cracking Resistance), low-temperature impact resistance, etc. may be prepared due to the high molecular weight. Such polyolefin may be used for blow-molding and applied to films, pipes, bottle caps, or the like.

Effects of the Invention

According to the present invention, a method of preparing a polyolefin is provided, the method capable of effectively preparing a polyolefin which has a higher molecular weight and a wider multimodal molecular weight distribution, thereby being preferably used for blow-molding.

The method of preparing a polyolefin may be used to very effectively prepare a polyolefin which has a low melt index, a wide molecular weight distribution, and higher environmental stress-cracking resistance (Full Notch Creep Test; FNCT), considering density or melt index, and thus is particularly suitable for blow-molding.

BRIEF DESCRIPTION OF THE DRAWINGS

FIG. 1 shows a schematic illustration of a cascade-CSTR reactor, in which a method of preparing a polyolefin of an embedment is performed, and a schematic flow of a polymerization process using the same.

DETAILED DESCRIPTION OF THE EMBODIMENT

Hereinafter, the preferred examples are provided for better understanding. However, these examples are for illustrative purposes only, and the invention is not intended to be limited by these examples.

EXAMPLE

Preparation Example of Metallocene Catalyst

Synthesis Example 1

Synthesis of [t-Bu-O(CH$_2$)$_6$—C$_5$H$_4$]$_2$ZrCl$_2$ t-butyl-O—(CH$_2$)$_6$—Cl was prepared using 6-chlorohexanol according to a method described in the document (*Tetrahedron Lett.* 2951 (1988)), and reacted with NaC$_5$H$_5$ to obtain t-butyl-O—(CH$_2$)$_6$—C$_5$H$_5$ (yield: 60%, b.p. 80° C./0.1 mmHg).

2.0 g (9.0 mmol) of t-butyl-O—(CH$_2$)$_6$—C$_5$H$_5$ was dissolved in THF at −78° C., and 1.0 equivalent weight of normal butyl lithium (n-BuLi) was slowly added thereto. The temperature was raised to room temperature, and reaction was allowed to proceed for 8 h. This reaction solution was slowly added to a suspension solution of ZrCl$_4$(THF)$_2$ (1.70 g, 4.50 mmol)/THF (30 mL) at −78° C., and then further reacted at room temperature for 6 h to obtain a final reaction solution.

The reaction solution was dried under vacuum to remove all volatile materials, and then hexane was added to the remaining oily liquid, followed by filtration using a Schlenk glass filter. The filtrate solution was dried under vacuum to remove the solvent, and then hexane was added thereto to induce precipitation at a low temperature (−20° C.). The resulting precipitate was filtered at a low temperature to obtain a [t-Bu-O(CH$_2$)$_6$—C$_5$H$_4$]$_2$ZrCl$_2$ compound as a white solid with a yield of 92%. $^1$H NMR and $^{13}$C NMR data of [t-Bu-O(CH$_2$)$_6$—C$_5$H$_4$]$_2$ZrCl$_2$ thus obtained are as follows.

$^1$H NMR (300 MHz, CDCl$_3$): 6.28 (t, J=2.6 Hz, 2H), 6.19 (t, J=2.6 Hz, 2H), 3.31 (t-J=6.6 Hz, 2H), 2.62 (t, J=8 Hz, 2H), 1.7-1.3 (m, 8H), 1.17 (s, 9H)

$^{13}$C NMR (CDCl$_3$): 135.09, 116.66, 112.28, 72.42, 61.52, 30.66, 30.61, 30.14, 29.18, 27.58, 26.00

Synthesis Example 2

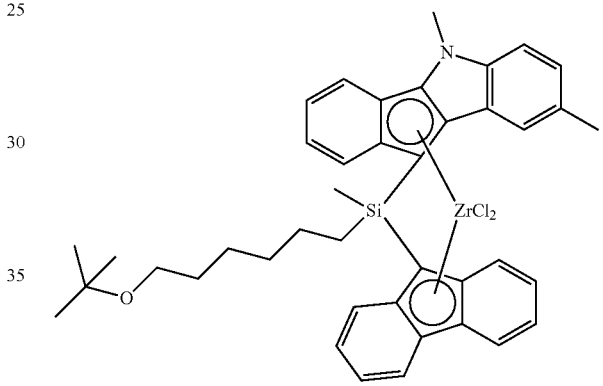

2-1. Preparation of Ligand Compound 2 g of fluorene was dissolved in 5 mL of MTBE, 100 mL of hexane, and then 5.5 mL of a 2.5 M n-BuLi hexane solution was added dropwise thereto in a dry ice/acetone bath, followed by stirring at room temperature overnight. 3.6 g of (6-(tert-butoxy)hexyl)dichloro(methyl)silane was dissolved in 50 mL of hexane, and a fluorene-Li slurry was transferred in a dry ice/acetone bath for 30 min, followed by stirring at room temperature overnight. Simultaneously, 5,8-dimethyl-5,10-dihydroindeno[1,2-b]indole (12 mmol, 2.8 g) was dissolved in 60 mL of THF, and 5.5 mL of a 2.5 M n-BuLi hexane solution was added dropwise thereto in a dry ice/acetone bath, followed by stirring at room temperature overnight. NMR sampling of the reaction solution of fluorene and (6-(tert-butoxy)hexyl)dichloro(methyl)silane was performed to confirm completion of the reaction, and then a 5,8-dimethyl-5,10-dihydroindeno[1,2-b]indole-Li solution was transferred to a dry ice/acetone bath. The mixture was stirred at room temperature overnight. After reaction, extraction was performed using ether/water, and an organic layer was dried over MgSO$_4$ to obtain a ligand compound (Mw 597.90, 12 mmol). Two isomers were observed in 1H-NMR.

$^1$H NMR (500 MHz, d6-benzene): −0.30--0.18 (3H, d), 0.40 (2H, m), 0.65-1.45 (8H, m), 1.12 (9H, d), 2.36-2.40 (3H, d), 3.17 (2H, m), 3.41-3.43 (3H, d), 4.17-4.21 (1H, d), 4.34-4.38 (1H, d), 6.90-7.80 (15H, m)

2-2. Preparation of Metallocene Compound 7.2 g (12 mmol) of the ligand compound prepared in 2-1 was dissolved in 50 mL of diethylether, and 11.5 mL of a 2.5 M n-BuLi hexane solution was added dropwise in a dry ice/acetone bath, followed by stirring at room temperature overnight. The solution was dried under vacuum to obtain a brown sticky oil, which was dissolved in toluene to obtain a slurry. $ZrCl_4(THF)_2$ was prepared, and 50 mL of toluene was added thereto to prepare a slurry. The 50 mL toluene slurry of $ZrCl_4(THF)_2$ was transferred in a dry ice/acetone bath, followed by stirring at room temperature overnight. The solution was changed to a violet color. This reaction solution was filtered to remove LiCl. Toluene was removed from the filtrate by drying under vacuum, and then hexane was added thereto, followed by sonication for 1 h. The slurry was filtered, and the filtered solid was 6 g of a dark violet metallocene compound (Mw 758.02, 7.92 mmol, yield 66 mol %). Two isomers were observed in 1H-NMR.

$^1$H NMR (500 MHz, $CDCl_3$): 1.19 (9H, d), 1.71 (3H, d), 1.50-1.70 (4H, m), 1.79 (2H, m), 1.98-2.19 (4H, m), 2.58 (3H, s), 3.38 (2H, m), 3.91 (3H, d), 6.66-7.88 (15H, m)

Synthesis Example 3

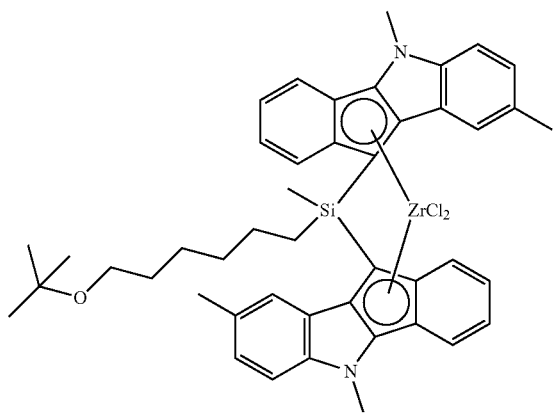

3-1. Preparation of Ligand Compound 2.1 g (9 mmol) of 5,8-dimethyl-5,10-dihydroindeno[1,2-b]indole was added to a 250 mL flask, in which the atmosphere was replaced by an argon atmosphere, and dissolved in 50 mL of THF. 3.9 mL (9.75 mmol) of a 2.5 M n-BuLi hexane solution was added dropwise thereto in a dry ice/acetone bath, followed by stirring at room temperature overnight. Thus, a yellow slurry was obtained. 50 ml of hexane was further injected, and 1.35 g of (6-(tert-butoxy)hexyl)dichloro(methyl)silane was added dropwise using a syringe in a dry ice/acetone bath, and the temperature was raised to room temperature, followed by stirring overnight. A small amount of the reaction product was sampled to confirm completion of the reaction by 1H-NMR. The solvent was dried under vacuum, and then the resulting solid was dissolved in 70 ml of toluene and filtered to remove LiCl. The resulting filtrate was used as is in metallation.

$^1$H NMR (500 MHz, CDCl3): −0.24 (3H, m), 0.30-1.40 (10H, m), 1.15 (9H, d), 2.33 (6H, d), 3.19 (2H, m), 4.05 (6H, d), 4.00 (2H, d), 6.95-7.72 (14H, m)

3-2. Preparation of Metallocene Compound 2 mL of MTBE was added to the toluene solution of the ligand compound prepared in 3-1, and then 3.9 mL (9.75 mmol) of a 2.5 M n-BuLi hexane solution was added dropwise in a dry ice/acetone bath, followed by stirring at room temperature overnight. In another flask, 1.7 g (4.5 mmol) of $ZrCl_4(THF)_2$ was prepared, and 100 ml of toluene was added thereto to prepare a slurry. The toluene slurry of $ZrCl_4(THF)_2$ was transferred to the lithiated ligand in a dry ice/acetone bath. The mixture was stirred at room temperature overnight, and the color was changed to violet. The reaction solution was filtered to remove LiCl, and the resulting filtrate was dried under vacuum, followed by sonication with hexane. The slurry was filtered, and the filtered solid was 3.44 g of a dark violet metallocene compound (yield 92.6 mol %).

$^1$H NMR (500 MHz, CDCl3): 1.20 (9H, d), 1.74 (3H, d), 1.50-2.36 (10H, m), 2.54 (6H, d), 3.40 (2H, m), 3.88 (6H, d), 6.48-7.90 (14H, m)

Synthesis Example 4: Preparation of Metallocene Supported Catalyst 4-1. Drying of Support Silica (manufactured by Grace Davison, SYLOPOL 948) was dehydrated under vacuum at a temperature of 400° C. for 15 h.

4-2. Preparation of Supported Catalyst 10 g of the dry silica was placed in a glass reactor, and then 100 mL of toluene was added thereto, followed by stirring. 50 mL of a 10 wt % methylaluminoxane(MAO)/toluene solution was added thereto, and the mixture was stirred at 40° C. and allowed to slowly react. Thereafter, the unreacted aluminum compound was removed by washing with a sufficient amount of toluene, and remaining toluene was removed under reduced pressure. 100 mL of toluene was injected again, and then 0.25 mmol of the metallocene catalyst prepared in Synthesis Example 3 was dissolved in toluene and injected. The reaction was allowed to proceed for 1 h, and then 0.25 mmol of the metallocene catalyst of Synthesis Example 2 was dissolved in toluene and injected. The reaction was further allowed to proceed for 1 h. After completion of the reaction, 0.25 mmol of the metallocene catalyst of Synthesis Example 1 was dissolved in toluene and injected. The reaction was further allowed to proceed for 1 h. After completion of the reaction, stirring was stopped, and a toluene layer was separated and removed. 1.0 mmol of anilinium borate (N,N-dimethylanilinium tetrakis(pentafluorophenyl)borate, AB) was injected and stirred for 1 h. Then, toluene was removed therefrom under reduced pressure at 50° C. to prepare a supported catalyst.

Preparation Example of Molecular Weight Modifier

Preparation Example 1: Preparation of Molecular Weight Modifier

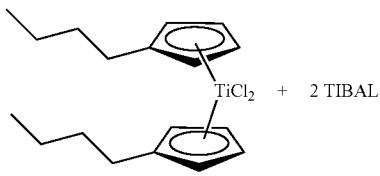

1.08 g (3 mmol) of bis(2-butylcyclopenta-2,4-dien-1-yl)titanium(IV) chloride was placed in a 250 mL round bottom flask, and 50 mL of hexane was added thereto, followed by stirring. 6 mL (6 mmol) of triisobutyl aluminum (1 M in hexane) was added thereto, followed by stirring at room temperature for 3 days(d). The solvent was removed under vacuum to obtain a blue liquid mixture. Because this mixture was under reduction of titanium, it was not oxidized or color-changed. The blue mixture was used as it is without purification, as below.

$^1$H NMR (CDCl$_3$, 500 MHz): 6.1-6.6 (br m, 8H), 2.2 (m, 4H), 1.0-1.8 (br m, 16H), 0.4 (br s, 24H)

Preparation Example 2: Preparation of Molecular Weight Modifier

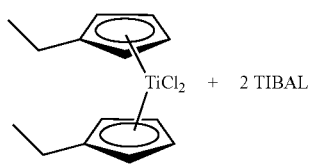

0.91 g (3 mmol) of bis(2-ethylcyclopenta-2,4-dien-1-yl)titanium(IV) chloride was placed in a 250 mL round bottom flask, and 50 mL of hexane was added thereto, followed by stirring. 6 mL (6 mmol) of triisobutyl aluminum (1 M in hexane) was added thereto, followed by stirring at room temperature for 3 d. The solvent was removed under vacuum to obtain a blue liquid mixture. Because this mixture was under reduction of titanium, it was not oxidized or color-changed. The blue mixture was used as it is without purification, as below.

$^1$H NMR (CDCl$_3$, 500 MHz): 6.2-6.6 (br m, 8H), 1.0-1.8 (br m, 7H), 0.8 (br s, 24H)

Preparation Example 3: Preparation of Molecular Weight Modifier

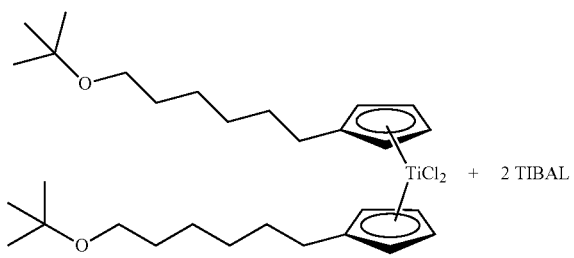

1.68 g (3 mmol) of bis(2-(6-t-butoxy-hexyl)cyclopenta-2,4-dien-1-yl)titanium(IV) chloride was placed in a 250 mL round bottom flask, and 50 mL of hexane was added thereto, followed by stirring. 6 mL (6 mmol) of triisobutyl aluminum (1 M in hexane) was added thereto, followed by stirring at room temperature for 3 d. The solvent was removed under vacuum to obtain a blue liquid mixture. Because this mixture was under reduction of titanium, it was not oxidized or color-changed. The blue mixture was used as it is without purification, as below.

$^1$H NMR (CDCl$_3$, 500 MHz): 6.31 (br m, 8H), 3.5 (m, 4H), 1.1-1.9 (br m, 28H), 0.9 (br s, 18H), 0.3 (br s, 18H)

Preparation Example 4: Preparation of Molecular Weight Modifier

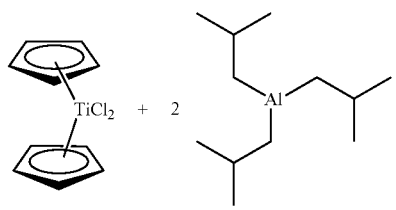

0.83 g of bis(cyclopentadienyl)-titanium dichloride and 50 mL of hexane were serially placed in a 250 mL round bottom flask, followed by stirring. 6 mL of triisobutyl aluminum (1 M in hexane) was added thereto, followed by stirring at room temperature for 3 d. The solvent was removed under vacuum to obtain a green mixture. Because this mixture was under reduction of titanium, it was not oxidized or color-changed. The green mixture was used as it is without purification, as below.

$^1$H NMR (CDCl$_3$, 500 MHz): 6.3-6.6 (br m, 10H), 1.2-1.8 (br m, 4H), 0.8 (br s, 18H)

Comparative Preparation Example 1: Preparation of Molecular Weight Modifier (Tebbe's Reagent)

0.83 g of bis(cyclopentadienyl)titanium dichloride and 50 mL of hexane were serially placed in a 250 mL round bottom flask, followed by stirring. 6 mL of trimethyl aluminum (1 M in hexane) was added thereto, followed by stirring at room temperature for 3 d. The solvent was removed under vacuum to obtain a green mixture. Because this mixture was under reduction of titanium, it was not oxidized or color-changed. The green mixture was used as it is without purification, as below.

$^1$H NMR (CDCl$_3$, 500 MHz): 6.4 (br m, 10H), 1.1-1.8 (m, 7H), 0.9 (br s, 18H)

Experimental Example 1

First, the molecular weight modifier of Comparative Preparation Example 1 was not in a solution form but in a slurry form, apparent to the naked eye.

However, the molecular weight modifiers of Preparation Examples 1 to 3 showed excellent performance in the following solubility test.

In particular, the molecular weight modifier of Preparation Example 1 was tested at concentrations of 0.1 M, 0.5 M, 1 M, and 2 M. After 1 d, no precipitates were observed at all concentrations of 0.1 M, 0.5 M, 1 M, and 2 M. After 7 d, no precipitates were observed at all concentrations of 0.1 M, 0.5 M, 1 M, and 2 M. After 30 d, no precipitates were observed at all concentrations of 0.1 M, 0.5 M, 1 M, and 2 M. That is, when the butyl group in the cyclopentadienyl group of the molecular weight modifier was substituted, no precipitation occurred even after 30 d. Further, the molecular weight modifier of Preparation Example 2 was tested at concentrations of 0.1 M, 0.5 M, 1 M, and 2 M. After 1 d, no precipitates were observed at all concentrations of 0.1 M, 0.5 M, 1 M, and 2 M. However, after 7 d, no precipitates were observed at concentrations of 0.1 M and 0.5 M, but precipitates were observed at concentrations of 1 M and 2 M. The molecular weight modifier of Preparation Example 3 was tested at concentrations of 1 M, 2 M, 3 M, and 5 M. After 1 d, no precipitates were observed at all of the concentrations. Even after 7 d and 30 d, no precipitates were observed at all of the concentrations.

According to the solubility test, the molecular weight modifier of Comparative Preparation Example 1 generates precipitates upon feeding to reduce uniformity in a practical plant operation, in which hexane is used as a solvent in a pressure vessel.

Example of Slurry Polymerization

Example 1

A continuous cascade CSTR reactor consisting of two reactors with a volume of 0.2 m³ was used (see FIG. 1).

Hexane, ethylene, hydrogen, and triethylaluminum (TEAL) were fed into a first reactor at a flow rate of 35 kg/h, 10 kg/h, 1.5 g/h, and 40 mmol/h, respectively. The metallocene supported catalyst prepared in Synthesis Example 4 was fed thereto at a flow rate of 1 g/h (180 μmol/h). In this regard, the first reactor was maintained at a temperature of 84° C. and a pressure of 9 bar. A retention time of the reactants was 2.5 h, and a slurry mixture containing polymers was continuously transferred to a second reactor while the liquid in the reactor was maintained at a predetermined level.

Hexane, ethylene, 1-hexene, and triethylaluminum (TEAL) were fed into a second reactor at a flow rate of 21 kg/h, 6.5 kg/h, 100 mL/h, and 20 mmol/h, respectively. The molecular weight modifier prepared in Preparation Example 1 was fed thereto at a flow rate of 80 μmol/h. In this regard, the second reactor was maintained at a temperature of 80° C. and a pressure of 7 bar. A retention time of the reactants was 1.5 h, and a polymer mixture was continuously transferred to a post reactor while the liquid in the reactor was maintained at a predetermined level.

The post reactor was maintained at a temperature of ° C., and unreacted monomers were polymerized therein. The polymer product was passed through solvent removal equipment and a dryer to prepare final polyethylene. The polyethylene thus prepared was mixed with 1000 ppm of calcium stearate (manufactured by DOOBON Inc.) and 2000 ppm of a thermal stabilizer 21B (manufactured by SONGWON Industrial Co.), and prepared as a pellet.

Comparative Example 1

A slurry polymerization was performed in the same manner as in Example 1, except that no molecular weight modifier was used.

Comparative Example 2

A slurry polymerization was performed in the same manner as in Example 1, except that 0.1 mol % of the molecular weight modifier of Comparative Preparation Example 1 (Tebbe's reagent) was used.

Comparative Example 3

A slurry polymerization was performed in the same manner as in Example 1, except that 0.3 mol % of the molecular weight modifier of Comparative Preparation Example 1 (Tebbe's reagent) was used.

Experimental Example 2

Properties of polyethylenes prepared in Example 1 and Comparative Examples 1 to 4 were measured by the following method, and the results are shown in the following Table 1.

a) Molecular weight (Mw): measured as a weight average molecular weight using gel permeation chromatography (GPC).

b) Molecular weight distribution (MWD): measured as a value obtained by dividing the weight average molecular weight by the number average molecular weight using gel permeation chromatography (GPC).

c) Catalytic activity: 0.5 g of TMA was dried in a reactor, and then about 100 mg of a supported catalyst was added to 400 mL of hexane, together with alkyl aluminum and the molecular weight modifier (MWE). Polymerization was allowed to proceed at 80° C. under 9 bar of ethylene for 1 h to obtain a polymer. The polymer was filtered and then dried overnight, and weighed to calculate its catalytic activity per unit time (h).

d) Melt index (MI): measured at a temperature of 190° C. under a load of 21.6 kg in accordance with ASTM 1238 of American Society for Testing Materials.

TABLE 1

| | Catalyst | MWE | Feed amount of MWE (mol %) | Activity (kgPE/gCat) | $M_w$ | MWD | MI (21.6) |
|---|---|---|---|---|---|---|---|
| Example 1 | Synthesis Example 4 | Preparation Example 1 | 0.1 | 1.9 | 330,000 | 3.8 | 1.0 |
| Comparative Example 1 | Synthesis Example 4 | — | — | 2.3 | 190,000 | 3.8 | 4.1 |
| Comparative Example 2 | Synthesis Example 4 | Comparative Preparation Example 1 | 0.1 | 1.6 | 220,000 | 3.6 | 3.5 |
| Comparative Example 3 | Synthesis Example 4 | Comparative Preparation Example 1 | 0.3 | 0.9 | 300,000 | 3.8 | 1.4 |

As shown in Table 1, according to the present invention, when the slurry polymerization process was performed, the polymer showed excellent solubility for the polymerization solvent, and the molecular weight of the polymer was also effectively increased during olefin polymerization without reduction in the activity or copolymerization.

Example of Solution Polymerization

Example 2

The prepared metallocene catalyst precursor was used to perform ethylene gas polymerization in a solution according to the polymerization scale and conditions in the following Table 2.

First, two Andrew bottles with 300 mL volume were prepared and assembled with impeller parts, and the atmosphere inside a glovebox was replaced by argon. 180 mL of toluene was added to each of the Andrew bottles treated in the glovebox (treated with a small amount of TMA), and 5 mL of MAO (10 wt % toluene) solution was added. 20 μmol of the metallocene catalyst (13 to 18 mg) prepared in Synthesis Example 1 was added to a 100 mL-flask separately prepared, and dissolved in 20 mL of toluene. Each 5 mL of the catalyst solutions was taken and injected into two Andrew bottles. The injected catalysts were reacted with MAO in the bottles to show specific different colors (pink, yellow, green, or purple). The molecular weight modifier prepared in Preparation Example 1 was injected into one of the two Andrew bottles. The bottle was placed in an oil bath heated to 90° C., and the upper part of the bottle was fixed in a mechanical stirrer. The bottle was purged with ethylene gas three times, and the mechanical stirrer was operated by opening an ethylene valve to allow reaction at 500 rpm for 30 min. A vortex line inside the bottle was frequently examined during the reaction. When the line became flat, the reaction was early terminated. After reaction, temperature was decreased to room temperature and gas inside the bottle was vented. The content was poured in about 400 mL of ethanol, and the solution was stirred for 1 h and then filtered. The polymer thus obtained was dried in a vacuum oven at 60° C. for 20 h to obtain a final polymer.

TABLE 2

| Catalyst content (μmol) | | 5 |
|---|---|---|
| Solvent | type | Toluene |
| | content (mL) | 180 |
| Activator | type | MAO solution |
| | content (mL) | 10 |
| Comonomer | type | 1-Hexene |
| | content (mL) | —/5 |
| Temperature (° C.) | | 90 |
| Pressure (psig) | | 50 |
| Reaction time (min) | | 30 |

Example 3

A solution polymerization was performed in the same manner as in Example 2, except that the molecular weight modifier of Preparation Example 4 was used.

Example 4

A solution polymerization was performed in the same manner as in Example 3, except that 0.3 mol % of the molecular weight modifier of Preparation Example 4 was used.

Comparative Example 4

A solution polymerization was performed in the same manner as in Example 2, except that no molecular weight modifier was used.

Comparative Example 5

A solution polymerization was performed in the same manner as in Example 2, except that the molecular weight modifier of Comparative Preparation Example 1 was used.

Comparative Example 6

A solution polymerization was performed in the same manner as in Example 2, except that 0.3 mol % of the molecular weight modifier of Comparative Preparation Example 1 was used.

Experimental Example 3

Properties of polyethylenes prepared in Examples 1 to 3 and Comparative Examples 5 to 7 were measured by the following method, and the results are shown in the following Table 3.

a) Molecular weight (Mw): measured as a weight average molecular weight using gel permeation chromatography (GPC).

b) Molecular weight distribution (MWD): measured as a value obtained by dividing the weight average molecular weight by the number average molecular weight using gel permeation chromatography (GPC).

c) Catalytic activity: 0.5 g of TMA was dried in a reactor, and then about 100 mg of a supported catalyst was added to 400 mL of hexane, together with alkyl aluminum and the molecular weight modifier (MWE). Polymerization was allowed to proceed at 80° C. under 9 bar of ethylene for 1 h to obtain a polymer. The polymer was filtered and then dried overnight, and weighed to calculate its catalytic activity per unit time (h).

d) Melt index (MI): measured at a temperature of 190° C. under a load of 2.16 kg in accordance with ASTM 1238 of American Society for Testing Materials.

TABLE 3

| | Catalyst | MWE | Feed amount of MWE (mol %) | Activity (kgPE/gCat) | Mw | MWD | MI (2.16) |
|---|---|---|---|---|---|---|---|
| Example 2 | Synthesis Example 1 | Preparation Example 1 | 0.1 | 6.4 | 101,000 | 12.9 | 0.3 |
| Example 3 | Synthesis Example 1 | Preparation Example 4 | 0.1 | 6.0 | 107,000 | 11.1 | 0.2 |
| Example 4 | Synthesis Example 1 | Preparation Example 4 | 0.3 | 5.8 | 123,000 | 12.5 | 1.0 |
| Comparative Example 4 | Synthesis Example 1 | — | — | 6.9 | 63,000 | 6.8 | 2.3 |

TABLE 3-continued

| | Catalyst | MWE | Feed amount of MWE (mol %) | Activity (kgPE/gCat) | Mw | MWD | MI (2.16) |
|---|---|---|---|---|---|---|---|
| Comparative Example 5 | Synthesis Example 1 | Comparative Preparation Example 1 | 0.1 | 5.9 | 69,000 | 8.2 | 2.1 |
| Comparative Example 6 | Synthesis Example 1 | Comparative Preparation Example 1 | 0.3 | 3.0 | 92,000 | 10.2 | 0.5 |

As shown in Table 3, according to the present invention, when the solution polymerization process was performed, the polymer showed excellent solubility for the polymerization solvent, and the molecular weight of the polymer was also effectively increased during olefin polymerization without reduction in the activity or copolymerization.

The invention claimed is:

1. A method of preparing a polyolefin, the method comprising the step of
polymerizing olefin monomers in the presence of a metallocene catalyst, and a molecular weight modifier including a mixture of a cyclopentadienyl metal compound of Chemical Formula 1 and an organic aluminum compound of Chemical Formula 2 or a reaction product thereof,
wherein the polymerization step is performed in a cascade reactor including a first reactor and a second reactor, and wherein the metallocene catalyst is fed into the first reactor and the molecular weight modifier is fed into the second reactor:

$$(R^1-Cp^1)(R^2-Cp^2)M^1X_2 \quad \text{[Chemical Formula 1]}$$

wherein $Cp^1$ and $Cp^2$ are each independently a ligand including a cyclopentadienyl group, an indenyl group, or a fluorenyl group; $R^1$ and $R^2$ are substituents of $Cp^1$ and $Cp^2$, and are each independently an alkyl having 2 to 20 carbon atoms, an alkenyl having 2 to 20 carbon atoms, an alkylaryl having 7 to 20 carbon atoms, an arylalkyl having 7 to 20 carbon atoms, an aryl having 6 to 20 carbon atoms, a heteroalkyl having 1 to 20 carbon atoms, a heteroalkenyl having 2 to 20 carbon atoms, a heteroalkylaryl having 6 to 20 carbon atoms, a heteroarylalkyl having 6 to 20 carbon atoms, or a heteroaryl having 5 to 20 carbon atoms; $M^1$ is a Group 4 transition metal element; and X is a halogen, $$R^3R^4R^5Al \quad \text{[Chemical Formula 2]}$$

wherein $R^3$, $R^4$, and $R^5$ are each independently an alkyl having 4 to 20 carbon atoms or a halogen, and at least one of $R^3$, $R^4$, and $R^5$ is an alkyl having 4 to 20 carbon atoms.

2. A method of preparing a polyolefin, the method comprising the step of
solution-polymerizing olefin monomers in the presence of a metallocene catalyst, and a molecular weight modifier including a mixture of a cyclopentadienyl metal compound of Chemical Formula 3 and an organic aluminum compound of Chemical Formula 4 or a reaction product thereof,
wherein the polymerization step is performed in a cascade reactor including a first reactor and a second reactor, and wherein the metallocene catalyst is fed into the first reactor and the molecular weight modifier is fed into the second reactor:

$$(R^6-Cp^3)(R^7-Cp^4)M^2X'_2 \quad \text{[Chemical Formula 3]}$$

wherein $Cp^3$ and $Cp^4$ are each independently a ligand including a cyclopentadienyl group, an indenyl group, or a fluorenyl group; $R^6$ and $R^7$ are substituents of $Cp^3$ and $Cp^4$ and are each independently hydrogen or a methyl; $M^2$ is a Group 4 transition metal element; and X' is a halogen, $$R^8R^9R^{10}Al \quad \text{[Chemical Formula 4]}$$

wherein $R^8$, $R^9$, and $R^{10}$ are each independently an alkyl having 4 to 20 carbon atoms or a halogen, and at least one of $R^8$, $R^9$, and $R^{10}$ is an alkyl having 4 to 20 carbon atoms.

3. The method of claim 1, wherein $R^1$ and $R^2$ are each independently selected from the group consisting of an ethyl, a butyl, and a t-butoxy hexyl.

4. The method of claim 1, wherein $R^3$, $R^4$ and $R^5$ are each independently an isobutyl.

5. The method of claim 1, wherein $M^1$ is selected from the group consisting of titanium, zirconium, and hafnium.

6. The method of claim 1, wherein X is selected from the group consisting of F, Cl, Br, and I.

7. The method of claim 1, wherein the olefin monomer includes one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbornadiene, ethylidene norbornene, phenylnorbornene, vinylnorbornene, dicyclopentadiene, 1,4-butadiene, 1,5-pentadiene, 1,6-hexadiene, styrene, alpha-methylstyrene, divinyl benzene, and 3-chloromethylstyrene.

8. The method of claim 1, wherein the molecular weight modifier is represented by the following Chemical Formula 5, Chemical Formula 6, or Chemical Formula 7:

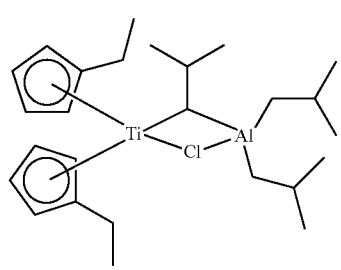

[Chemical Formula 5]

-continued

[Chemical Formula 6]

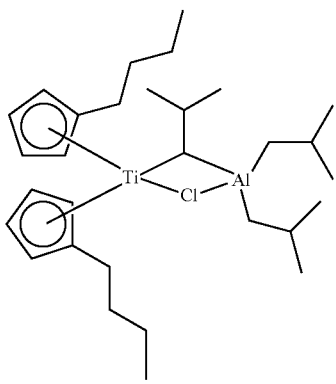

[Chemical Formula 7]

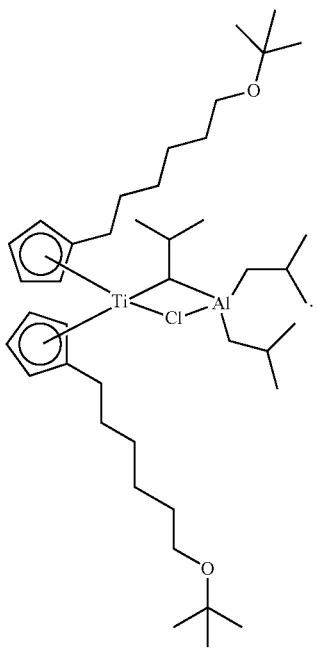

9. The method of claim 2, wherein the molecular weight modifier is represented by the following Chemical Formula 8:

[Chemical Formula 8]

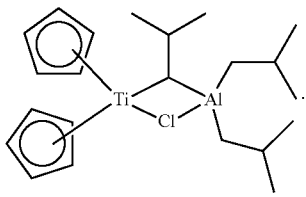

10. The method of claim 1, wherein the molecular weight modifier is used in an amount of about $10^{-7}$ to $10^{-1}$ parts by weight, based on a total of 100 parts by weight of the olefin monomer.

11. The method of claim 1, wherein the metallocene catalyst includes one or more metallocene compounds represented by any one of the following Chemical Formulae 9 to 12:

$(Cp^5R^a)_n(Cp^6R^b)M^3Z^1_{3-n}$ [Chemical Formula 9]

wherein $M^3$ is a Group 4 transition metal;
Cp$^5$ and Cp$^6$ are the same as or different from each other, and are each independently any one selected from the group consisting of cyclopentadienyl, indenyl, 4,5,6,7-tetrahydro-1-indenyl, and fluorenyl radicals, and these are substituted with a hydrocarbon having 1 to 20 carbon atoms;
$R^a$ and $R^b$ are the same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;
$Z^1$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy; and
n is 1 or 0;

$(Cp^7R^c)_mB^1(Cp^8R^d)M^4Z^2_{3-m}$ [Chemical Formula 10]

wherein $M^4$ is a Group 4 transition metal;
Cp$^7$ and Cp$^8$ are the same as or different from each other, and are each independently any one selected from the group consisting of cyclopentadienyl, indenyl, 4,5,6,7-tetrahydro-1-indenyl, and fluorenyl radicals, and these are substituted with a hydrocarbon having 1 to 20 carbon atoms;
$R^c$ and $R^d$ are the same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;
$Z^2$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy;
$B^1$ is any one or more of carbon, germanium, silicon, phosphorus, or nitrogen atom-containing radicals, which crosslink a Cp$^3$R$^c$ ring and a Cp$^4$R$^d$ ring or crosslinks one Cp$^4$R$^d$ ring to M$^2$, or a combination thereof; and
m is 1 or 0;

$(Cp^9R^e)B^2(J)M^5Z^3_2$ [Chemical Formula 11]

wherein $M^5$ is a Group 4 transition metal;
Cp$^9$ is any one selected from the group consisting of cyclopentadienyl, indenyl, 4,5,6,7-tetrahydro-1-indenyl, and fluorenyl radicals, and these are substituted with a hydrocarbon having 1 to 20 carbon atoms;
$R^e$ is hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;
$Z^3$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy;

B² is any one or more of carbon, germanium, silicon, phosphorus, or nitrogen atom-containing radicals, which crosslink a Cp⁵Rᵉ ring to J, or a combination thereof;

J is any one selected from the group consisting of NRᶠ, O, PRᶠ, and S; and Rᶠ is a C1 to C20 alkyl, aryl, substituted alkyl, or substituted aryl,

[Chemical Formula 12]

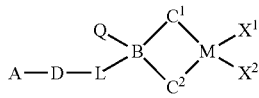

wherein A is hydrogen, a halogen, a C1 to C20 alkyl, a C2 to C20 alkenyl, a C6 to C20 aryl, a C7 to C20 alkylaryl, a C7 to C20 arylalkyl, a C1 to C20 alkoxy, a C2 to C20 alkoxyalkyl, a C3 to C20 heterocycloalkyl, or a C5 to C20 heteroaryl;

D is —O—, —S—, —N(R)—, or —Si(R)(R')—, in which R and R' are the same as or different from each other, and are each independently hydrogen, a halogen, a C1 to C20 alkyl, a C2 to C20 alkenyl, or a C6 to C20 aryl;

L is a C1 to C10 straight or branched alkylene;

B is carbon, silicon, or germanium;

Q is hydrogen, halogen, C1 to C20 alkyl, C2 to C20 alkenyl, C6 to C20 aryl, C7 to C20 alkylaryl, or C7 to C20 arylalkyl;

M is a Group 4 transition metal;

X¹ and X² are the same as or different from each other, and are each independently a halogen, a C1 to C20 alkyl, a C2 to C20 alkenyl, a C6 to C20 aryl, a nitro group, an amido group, a C1 to C20 alkylsilyl, a C1 to C20 alkoxy, or a C1 to C20 sulfonate;

C¹ and C² are, the same or different from each other, and are each independently represented by any one of the following Chemical Formula 13a, Chemical Formula 13b, and Chemical Formula 13c, excluding that both C¹ and C² are Chemical Formula 13c;

[Chemical Formula 13a]

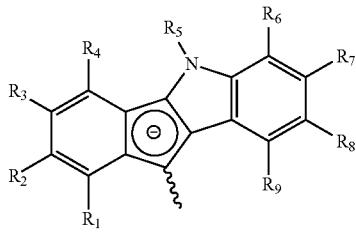

[Chemical Formula 13b]

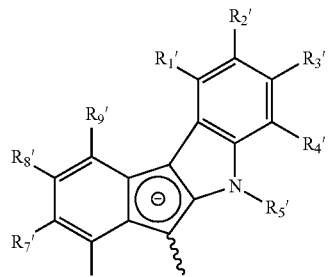

[Chemical Formula 13c]

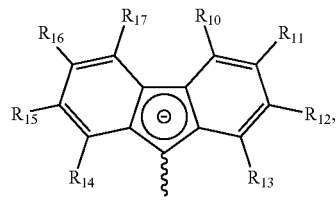

wherein R1 to R17 and R1' to R9' are the same as or different from each other, and are each independently hydrogen, a halogen, a C1 to C20 alkyl, a C2 to C20 alkenyl, a C1 to C20 alkylsilyl, a C1 to C20 silylalkyl, a C1 to C20 alkoxysilyl, a C1 to C20 alkoxy, a C6 to C20 aryl, a C7 to C20 alkylaryl, or a C7 to C20 arylalkyl, and two or more neighboring groups of R10 to R17 are connected to each other to form a substituted or unsubstituted aliphatic or aromatic ring.

12. The method of claim 1, wherein the metallocene catalyst is supported on one or more supports selected from the group consisting of silica, silica-alumina, and silica-magnesia.

13. The method of claim 2, wherein R⁸, R⁹, and R¹⁰ are each independently an isobutyl.

14. The method of claim 2, wherein is selected from the group consisting of titanium, zirconium, and hafnium.

15. The method of claim 2, wherein X' is selected from the group consisting of F, Cl, Br, and I.

16. The method of claim 2, wherein the olefin monomer includes one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbornadiene, ethylidene norbornene, phenylnorbornene, vinylnorbornene, dicyclopentadiene, 1,4-butadiene, 1,5-pentadiene, 1,6-hexadiene, styrene, alpha-methylstyrene, divinyl benzene, and 3-chloromethylstyrene.

17. The method of claim 2, wherein the molecular weight modifier is used in an amount of about $10^{-7}$ to $10^{-1}$ parts by weight, based on a total of 100 parts by weight of the olefin monomer.

* * * * *